(12) United States Patent
Kim

(10) Patent No.: US 6,906,577 B2
(45) Date of Patent: Jun. 14, 2005

(54) VOLTAGE BOOSTING CIRCUIT AND METHOD

(75) Inventor: Hyoung-Rae Kim, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 10/925,116

(22) Filed: Aug. 24, 2004

(65) Prior Publication Data

US 2005/0047180 A1 Mar. 3, 2005

(30) Foreign Application Priority Data

Aug. 26, 2003 (KR) .................................. 10-2003-0059094

(51) Int. Cl.[7] ................................................ G05F 1/10
(52) U.S. Cl. ...................................... 327/536; 307/110
(58) Field of Search ......................... 327/536; 307/109, 307/110; 363/59, 60

(56) References Cited

U.S. PATENT DOCUMENTS 5,606,491 A * 2/1997 Ellis ............................ 363/60

* cited by examiner

Primary Examiner—Shawn Riley
(74) Attorney, Agent, or Firm—F. Chau & Associates, LLC

(57) ABSTRACT

A voltage boosting circuit, boosting power supply unit and methods thereof are provided. A boosting power supply unit includes a boosting circuit having a small number of externally-mounted capacitors, which generates stepped-up and stepped-down boosted voltages through charging and pumping under two-phase control, so that the simultaneous output of the stepped-up voltage and the stepped-down voltage, the output of only the stepped-up voltage, the output of only the stepped-down voltage, and the cut-off of the output of the stepped-up voltage and the stepped-down voltage can be controlled on the basis of the phase control signal generated from the enable signals of which the logic states are changed in accordance with an amount of load.

42 Claims, 17 Drawing Sheets

VOLTAGE BOOSTING CIRCUIT AND METHOD

CROSS-REFERENCE TO RELATED APPLICATION

This application claims priority to Korean Patent Application No. 2003-59094, filed on Aug. 26, 2003, in the Korean Intellectual Property Office, the disclosure of which is incorporated herein in its entirety by reference.

BACKGROUND OF THE INVENTION

1. Technical Field

The present invention relates to a power supply unit, and more specifically, to a boosting power supply unit and a power boosting control method.

2. Discussion of the Related Art

In general, thin film transistors (TFTs) in liquid crystal panels having a turn on voltage of about 20V and a turn off voltage of about −20V are used to drive TFT liquid crystal display devices (LCDs), such as those for use with mobile video graphic adapters (VGA), etc. Such TFT turn-on/off voltages have slight deviations depending on the types of TFTs (for example, amorphous silicon (a-Si) TFTs, low-temperature polysilicon (LTPS) TFTs, continuous grain silicon (CGS) TFTs, etc.) used in the liquid crystal panels, and the sizes of the liquid crystal panels. Because the voltages applied from battery powered sources of mobile devices, such as mobile TFT LCDs, are generally about 3V, boosting circuits for stepping up the voltages from 3V to 20V or stepping down the voltages from 3V to −20V are required to drive the mobile TFT LCDs.

U.S. Pat. No. 5,461,557 discloses a conventional boosting circuit 100 as shown in FIG. 1.

Referring to FIG. 1, the conventional boosting circuit 100 comprises ten switches SW1 through SW10, and four capacitors Ca through Cd, and generates a boosted positive voltage 3VDD, which is three times a source voltage VDD, by stepping up the source voltage VDD, and a boosted negative voltage −2VDD, which is two times the source voltage VDD, by stepping down the source voltage VDD. For example, as shown in FIG. 1, the source voltage VDD is applied to a first capacitor Ca and a second capacitor Cb through the switches SW1 through SW4, which are closed in response to a first clock signal P1. The boosted positive voltage 3VDD is successively output from a third capacitor Cc through the switches SW5 through SW7, which are closed in response to a second clock signal P2. Similarly, the source voltage VDD is applied to the first capacitor Ca and the second capacitor Cb, and then the boosted negative voltage −2VDD is output from a fourth capacitor Cd through the switches SW8 through SW10, which are closed in response to a third clock signal P3. The stepped-up and stepped-down voltages (e.g., 3VDD and −2VDD, respectively) generated by the conventional boosting circuit 100 are used as a power source to drive gates of the TFTs, for example, TFTs in the liquid crystal panel of LCDs, etc., and thus turn the TFTs on or off. In addition, the stepped-up and stepped-down voltages can be used for circuits, which need to obtain high voltages from low voltages, and circuits, which need to obtain low voltages from high voltages, etc.

Although the conventional boosting circuit 100 can output the boosted positive voltage 3VDD and the boosted negative voltage −2VDD under two-phase driving, the source voltage VDD applied to the capacitors Ca through Cd is constant, so that a boosting efficiency of the conventional boosting circuit 100 is low. Further, the conventional boosting circuit 100 cannot generate a variety of boosted voltages, such as boosted voltages, which are four times and six times the source voltage VDD, etc. In addition, because conventional power supply units comprising the conventional boosting circuit 100 output the boosted voltages without regard to the amount of load power there is a large amount of power consumption.

SUMMARY OF THE INVENTION

A boosting circuit is provided, having a small number of externally-mounted capacitors, which generates stepped-up and stepped-down boosted voltages through charging and pumping under two-phase driving, and a power supply unit for controlling the simultaneous output of a stepped-up voltage and a stepped-down voltage, an output of the stepped-up voltage, an output of the stepped-down voltage, and a cut-off of the output of the stepped-up voltage and the stepped-down voltage on the basis of a phase control signal generated from enable signals having logic states, which are changed in accordance with an amount of load, thereby minimizing its power consumption.

A power boosting method is provided for controlling the simultaneous output of a stepped-up voltage and a stepped-down voltage, an output of the stepped-up voltage, an output of the stepped-down voltage, and a cut-off of the output of the stepped-up voltage and the stepped-down voltage on the basis of a phase control signal generated from enable signals having logic states, which are changed in accordance with an amount of load.

A boosting circuit is also provided, comprising first through fourth capacitors, and first through fourteenth switches.

The first capacitor is connected between a first node and a second node. The second capacitor is connected between a third node and a fourth node. The third capacitor is connected between a first boosted voltage output node and a third power source. The fourth capacitor is connected between a second boosted voltage output node and the third power source. The first switch selectively connects or disconnects a fourth power source and the first node in response to a logic state of a first control signal. The second switch selectively connects or disconnects the fourth power source and the third node in response to a logic state of a second control signal. The third switch selectively connects or disconnects the third power source and the third node in response to a logic state of a third control signal. The fourth switch selectively connects or disconnects the first node and the first boosted voltage output node in response to a logic state of a fourth control signal. The fifth switch selectively connects or disconnects the first node and a first power source in response to a logic state of a fifth control signal. The sixth switch selectively connects or disconnects the first node and the third node in response to a logic state of a sixth control signal. The seventh switch selectively connects or disconnects the third node and the first boosted voltage output node in response to a logic state of a seventh control signal. The eighth switch selectively connects or disconnects the second node and the first power source in response to a logic state of an eighth control signal. The ninth switch selectively connects or disconnects the second node and the third power source in response to a logic state of a ninth control signal. The tenth switch selectively connects or disconnects the fourth node and the first power source in response to a logic state of a tenth control signal. The eleventh switch selectively connects or disconnects the fourth node and the third power source in response to a logic state of an eleventh control signal. The twelfth switch selectively connects or disconnects the fourth node and a second power source in response to a logic state of a twelfth control signal. The thirteenth switch selectively connects or disconnects the fourth node and the second boosted voltage output node in response to a logic state of a thirteenth control signal. The fourteenth switch selectively connects or disconnects the second node and the second boosted voltage output node in response to a logic state of a fourteenth control signal.

A boosting circuit is further provided, comprising first through third capacitors, and first through ninth switches.

The first capacitor is connected between a first node and a second node. The second capacitor is connected between a third node and a fourth node. The third capacitor is connected between a boosted voltage output node and a third power source. The first switch selectively connects or disconnects the first node and a first power source in response to a logic state of a first control signal. The second switch selectively connects or disconnects the first node and the third node in response to a logic state of a second control signal. The third switch selectively connects or disconnects the third node and the boosted voltage output node in response to a logic state of a third control signal. The fourth switch selectively connects or disconnects the first node and the boosted voltage output node in response to a logic state of a fourth control signal. The fifth switch selectively connects or disconnects the second node and the first power source in response to a logic state of a fifth control signal. The sixth switch selectively connects or disconnects the second node and the third power source in response to a logic state of a sixth control signal. The seventh switch selectively connects or disconnects the fourth node and the first power source in response to a logic state of a seventh control signal. The eighth switch selectively connects or disconnects the fourth node and a second power source in response to a logic state of an eighth control signal. The ninth switch selectively connects or disconnects the fourth node and the third power source in response to a logic state of a ninth control signal.

Another boosting circuit is provided, comprising first through third capacitors, and first through tenth switches.

The first capacitor is connected between a first node and a second node. The second capacitor is connected between a third node and a fourth node. The third capacitor is connected between a boosted voltage output node and a third power source. The first switch selectively connects or disconnects the first node and the third power source in response to a logic state of a first control signal. The second switch selectively connects or disconnects the first node and the third node in response to a logic state of a second control signal. The third switch selectively connects or disconnects the third node and the boosted voltage output node in response to a logic state of a third control signal. The fourth switch selectively connects or disconnects the first node and the boosted voltage output node in response to a logic state of a fourth control signal. The fifth switch selectively connects or disconnects the second node and the third power source in response to a logic state of a fifth control signal. The sixth switch selectively connects or disconnects the second node and a first power source in response to a logic state of a sixth control signal. The seventh switch selectively connects or disconnects the second node and a second power source in response to a logic state of a seventh control signal. The eighth switch selectively connects or disconnects the fourth node and the third power source in response to a logic state of an eighth control signal. The ninth switch selectively connects or disconnects the fourth node and the second power source in response to a logic state of a ninth control signal. The tenth switch selectively connects or disconnects the fourth node and the first power source in response to a logic state of a tenth control signal.

The switches may be formed using metal-oxide-semiconductor field effect transistors (MOSFETs). Each of the boosted voltage output nodes may output boosted voltages under two-phase control of the control signals. The first boosted voltage output node and the second boosted voltage output node may output three boosted positive voltages and three boosted negative voltages in response to the control signals, respectively.

A boosting power supply unit is provided, comprising a phase control signal generator, a switch control signal generator and a boosting circuit.

The phase control signal generator outputs a phase control signal having one of a two-phase pulse form and a logic state value form in response to each of four logic combinations of a first enable signal and a second enable signal. The switch control signal generator generates and outputs two-phase step-down switch control signals corresponding to a mode signal in a first logic state of the phase control signal, and generates and outputs two-phase step-up switch control signals corresponding to the mode signal in a second logic state of the phase control signal. The boosting circuit outputs boosted negative voltages by means of capacitors subjected to two-phase control of the step-down switch control signals, and outputs boosted positive voltages by means of capacitors subjected to two-phase control of the step-up switch control signals.

The first enable signal and the second enable signal may be digital signals having different logic states with respect to above and below a threshold amount of power in response to amounts of power consumed in loads connected to the boosted positive voltage and the boosted negative voltage. When both of the first enable signal and the second enable signal have a first logic state, at least one signal of the step-down switch control signals and at least one signal of the step-up switch control signals may be not activated.

The boosting circuit may comprise shared capacitors subjected to two-phase control of the step-down switch control signals and the step-up switch control signals, alternately output the boosted positive voltage by the step-up switch control signals and the boosted negative voltage by the step-down switch control signals when the phase control signal has a two-phase pulse form, and output one of the boosted positive voltage and the boosted negative voltage when the phase control signal has a logic state value form. The boosting circuit may comprise separate capacitors subjected to two-phase control of each of the step-down switch control signals and the step-up switch control signals, alternately output the boosted positive voltage by the step-up switch control signals and the boosted negative voltage by the step-down switch control signals when the phase control signal has a two-phase pulse form, and output one of the boosted positive voltage and the boosted negative voltage when the phase control signal has a logic state value form.

A voltage boosting method is provided, which outputs a boosted positive voltage to a first boosted voltage output node and outputs a boosted negative voltage to a second boosted voltage output node by sharing a first capacitor connected between a first node and a second node, a second capacitor connected between a third node and a fourth node, a third capacitor connected between the first boosted voltage output node and a third power source, and a fourth capacitor connected between the second boosted voltage output node and the third power source, the voltage boosting method comprising the following steps: (a) selectively connecting or disconnecting a fourth power source and the first node in response to a logic state of a first control signal; (b) selectively connecting or disconnecting the fourth power source and the third node in response to a logic state of a second control signal; (c) selectively connecting or disconnecting the third power source and the third node in response to a logic state of a third control signal; (d) selectively connecting or disconnecting the first node and the first boosted voltage output node in response to a logic state of a fourth control signal; (e) selectively connecting or disconnecting the first node and a first power source in response to a logic state of a fifth control signal; (f) selectively connecting or disconnecting the first node and the third node in response to a logic state of a sixth control signal; (g) selectively connecting or disconnecting the third node and the first boosted voltage output node in response to a logic state of a seventh control signal; (h) selectively connecting or disconnecting the second node and the first power source in response to a logic state of an eighth control signal; (i) selectively connecting or disconnecting the second node and the third power source in response to a logic state of a ninth control signal; (j) selectively connecting or disconnecting the fourth node and the first power source in response to a logic state of a tenth control signal; (k) selectively connecting or disconnecting the fourth node and the third power source in response to a logic state of an eleventh control signal; (l) selectively connecting or disconnecting the fourth node and a second power source in response to a logic state of a twelfth control signal; (m) selectively connecting or disconnecting the fourth node and the second boosted voltage output node in response to a logic state of a thirteenth control signal; and (n) selectively connecting or disconnecting the second node and the second boosted voltage output node in response to a logic state of a fourteenth control signal.

Another voltage boosting method is provided, which outputs a boosted voltage by using a first capacitor connected between a first node and a second node, a second capacitor connected between a third node and a fourth node and a third capacitor connected between a boosted voltage output node and a third power source, the voltage boosting method comprising the following steps: (a) selectively connecting or disconnecting the first node and a first power source in response to a logic state of a first control signal; (b) selectively connecting or disconnecting the first node and the third node in response to a logic state of a second control signal; (c) selectively connecting or disconnecting the third node and the boosted voltage output node in response to a logic state of a third control signal; (d) selectively connecting or disconnecting the first node and the boosted voltage output node in response to a logic state of a fourth control signal; (e) selectively connecting or disconnecting the second node and the first power source in response to a logic state of a fifth control signal; (f) selectively connecting or disconnecting the second node and the third power source in response to a logic state of a sixth control signal; (g) selectively connecting or disconnecting the fourth node and the first power source in response to a logic state of a seventh control signal; (h) selectively connecting or disconnecting the fourth node and a second power source in response to a logic state of an eighth control signal; and (i) selectively connecting or disconnecting the fourth node and the third power source in response to a logic state of a ninth control signal.

A voltage boosting method is further provided, which outputs a boosted voltage by using a first capacitor connected between a first node and a second node, a second capacitor connected between a third node and a fourth node, and a third capacitor connected between a boosted voltage output node and a third power source, the voltage boosting method comprising the following steps: (a) selectively connecting or disconnecting the first node and the third power source in response to a logic state of a first control signal; (b) selectively connecting or disconnecting the first node and the third node in response to a logic state of a second control signal; (c) selectively connecting or disconnecting the third node and the boosted voltage output node in response to a logic state of a third control signal; (d) selectively connecting or disconnecting the first node and the boosted voltage output node in response to a logic state of a fourth control signal; (e) selectively connecting or disconnecting the second node and the third power source in response to a logic state of a fifth control signal; (f) selectively connecting or disconnecting the second node and a first power source in response to a logic state of a sixth control signal; (g) selectively connecting or disconnecting the second node and a second power source in response to a logic state of a seventh control signal; (h) selectively connecting or disconnecting the fourth node and the third power source in response to a logic state of an eighth control signal; (i) selectively connecting or disconnecting the fourth node and the second power source in response to a logic state of a ninth control signal; and (j) selectively connecting or disconnecting the fourth node and the first power source in response to a logic state of a tenth control signal.

A power boosting control method is provided, comprising steps of: (a) outputting a phase control signal having one of two-phase pulse form and logic state value form in response to each of four logic combinations of a first enable signal and a second enable signal; (b) generating and outputting two-phase step-down switch control signals corresponding to a mode signal in a first logic state of the phase control signal, and generating and outputting two-phase step-up switch control signals corresponding to the mode signal in a second logic state of the phase control signal; and (c) outputting boosted negative voltages by means of capacitors subjected to two-phase control of the step-down switch control signals, and outputting boosted positive voltages by means of capacitors subjected to two-phase control of the step-up switch control signals.

BRIEF DESCRIPTION OF THE DRAWINGS

The above and other features of the present invention will become more apparent by describing in detail exemplary embodiments thereof with reference to the attached drawings, in which.

DETAILED DESCRIPTION OF EXEMPLARY EMBODIMENTS

Figure 1:
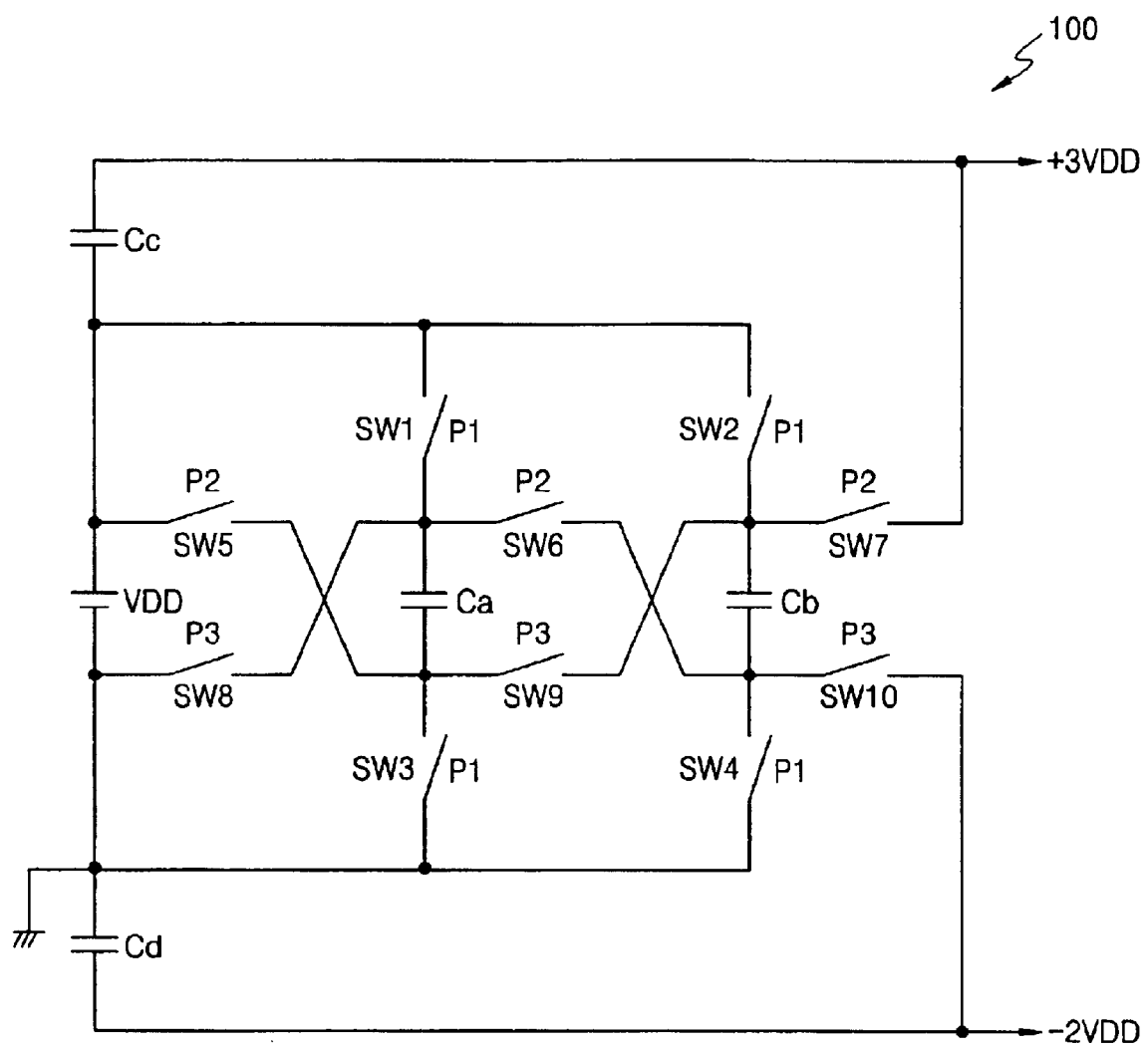
FIG. 1 shows a conventional boosting circuit.
Figure 2:
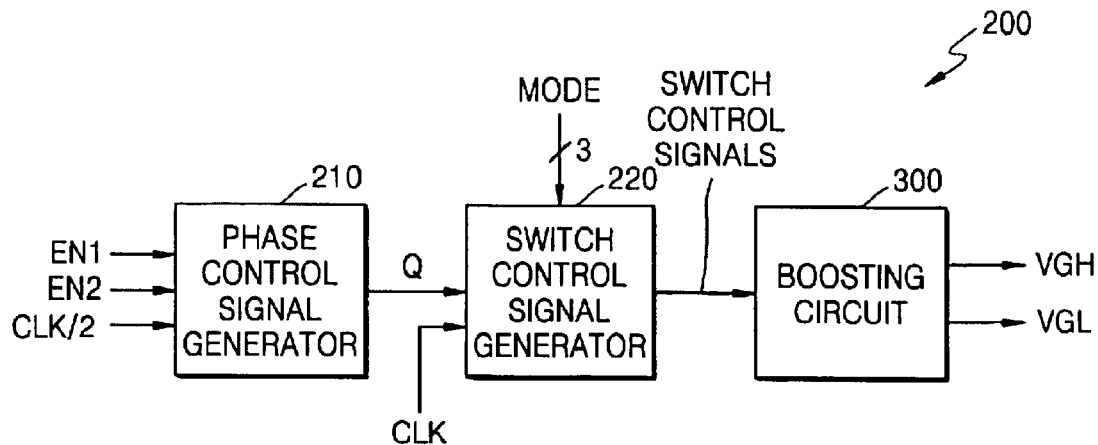
FIG. 2 is a block diagram of a boosting power supply unit according to an exemplary embodiment of the present invention.

FIG. 2 is a block diagram of a boosting power supply unit 200 according to an exemplary embodiment of the present invention. Referring to FIG. 2, the boosting power supply unit 200 comprises a phase control signal generator 210, a switch control signal generator 220, and a boosting circuit 300.

The phase control signal generator 210 outputs a phase control signal Q having either a two phase pulse form or a logic state value form in response to each of four logic combinations of a first enable signal EN1 and a second enable signal EN2. A second clock signal CLK/2 is used to generate the phase control signal Q. The second clock signal CLK/2 is a clock signal obtained by dividing the frequency of a first clock signal CLK into two.

The switch control signal generator 220 generates and outputs two-phase step-down switch control signals corresponding to a mode signal MODE in a first logic state (for example, a low logic state) of the phase control signal Q, and generates and outputs two-phase step-up switch control signals corresponding to the mode signal MODE in a second logic state (for example, a high logic state) of the phase control signal Q.

The boosting circuit 300 outputs boosted negative voltages VGL through capacitors subjected to control of the two-phase step-down switch control signals, and outputs boosted positive voltages VGH through capacitors subjected to control of the two-phase step-up switch control signals.

The first enable signal EN1 and the second enable signal EN2 are digital signals having different logic states, which are above and below a predetermined threshold amount of power, respectively, in response to an amount of power consumed in loads connected to the boosted positive voltages VGH and the boosted negative voltages VGL. If the amount of power consumed by the loads is large, magnitudes of the boosted positive voltages VGH and the boosted negative voltages VGL are reduced.

Accordingly, a system for generating digital signals (e.g., EN1 and EN2) having different logic states, which are above and below a predetermined threshold value, by comparing the magnitudes with the predetermined threshold value can be implemented. For example, when the first enable signal EN1 and the second enable signal EN2 are at the first logic state, some of the step-down switch control signals and some of the step-up switch control signals are not active. This occurs, because if the amount of power consumed in the loads connected to the boosted power voltages (e.g., VGH and VGL) is small, charging and pumping operations for outputting the boosted positive voltages VGH and the boosted negative voltages VGH are prevented, thereby reducing the power consumption due to such switching. The digital signals such as the first enable signal EN1, the second enable signal EN2 and the phase control signal Q are shown in the timing charts of FIGS. 6 through 13 and will be described in more detail later.

The switch control signal generator 220 uses the first clock signal CLK having two phases with a predetermined period, the second clock signal CLK/2 obtained by dividing the frequency of the first clock signal CLK into two, and a third clock signal CLK_d obtained by delaying the first clock signal CLK for a predetermined time, to generate two-phase step-down switch control signals or two-phase step-up switch control signals in the first logic state and the second logic state of the phase control signal Q. The first clock signal CLK, the second clock signal CLK/2 and the third clock signal CLK_d are shown in the timing charts of FIGS. 6 through 13 and will be described in more detail later.

The magnitudes of the boosted negative voltages VGL and the boosted positive voltages VGH are determined in accordance with the mode signal MODE. There are three types of boosted positive voltages VGH, that is, 4VCI, 5VCI and 6VCI discussed with reference to FIG. 14A, and there are three types of boosted negative voltages VGL, that is, −3VCI, −4VCI and −5VCI discussed with reference to FIG.

14B. The boosting circuit 300 shown in FIG. 3 can output all of the three types of boosted positive voltages VGH and the three types of boosted negative voltages VGL. As described above, the magnitudes of the boosted positive voltages VGH and the boosted negative voltages VGL are determined in accordance with the mode signal MODE, which is a signal generated when a user sets up a system corresponding to their desired purpose.

Figure 3:
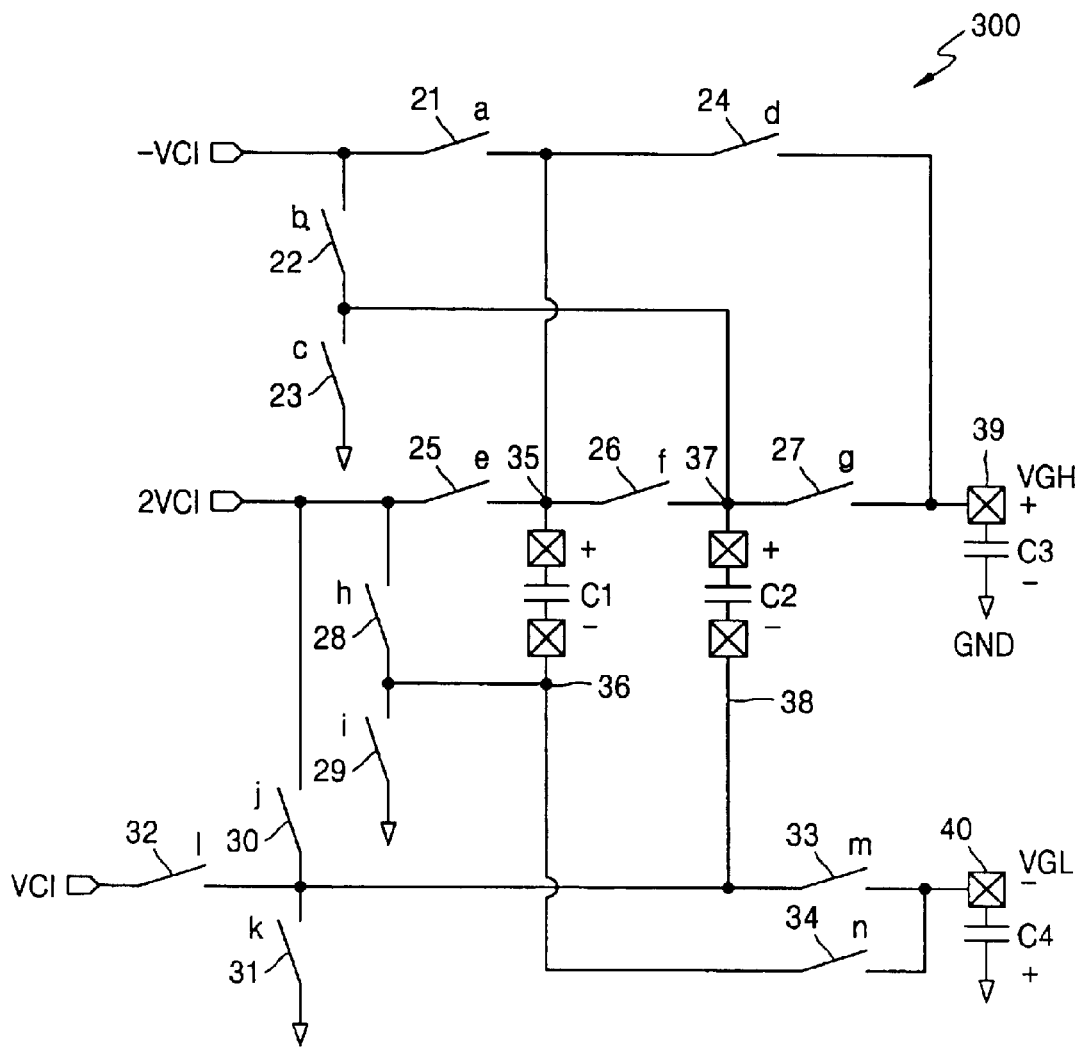
FIG. 3 is a first circuit diagram illustrating a boosting circuit shown in FIG. 2.

The boosting circuit 300 of FIG. 3 comprises, shared capacitors C1 through C3 subjected to control of the two-phase step-down switch control signals (a through n in a negative booster) and the two-phase step-up switch control signals (a through n in a positive booster). When the phase control signal Q has a two-phase pulse form, the boosting circuit 300 alternately outputs the boosted positive voltages VGH due to the two-phase step-up switch control signals (a through n in the positive booster) and the boosted negative voltages VGL due to the two-phase step-down switch control signals (a through n in the negative booster), and when the phase control signal Q has a logic state value form, outputs one of the boosted positive voltages VGH and the boosted negative voltages VGL. In this case, because the boosted positive voltages VGH and the boosted negative voltages VGL are output from one circuit, it is possible to reduce the number of externally-mounted capacitors C1 through C3.

Figure 14A:
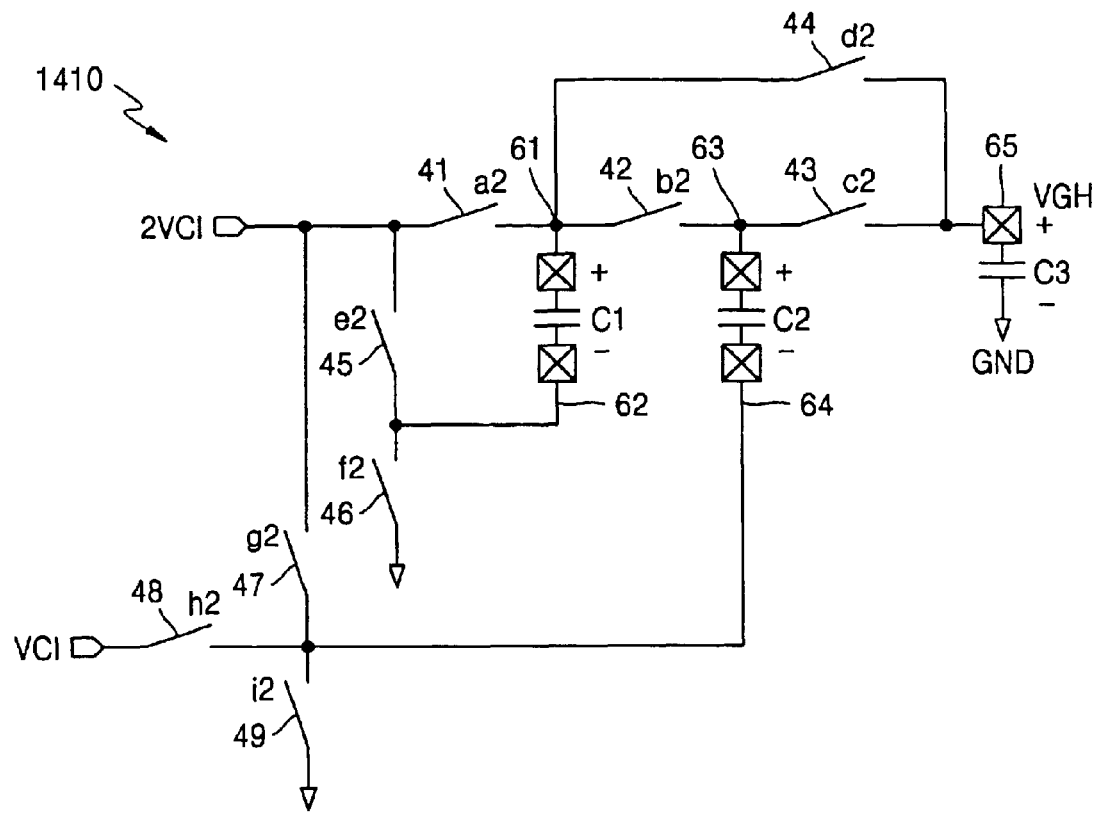
FIGS. 14A and 14B are first and second circuit diagrams illustrating the boosting circuit shown in FIG. 2.
Figure 14B:
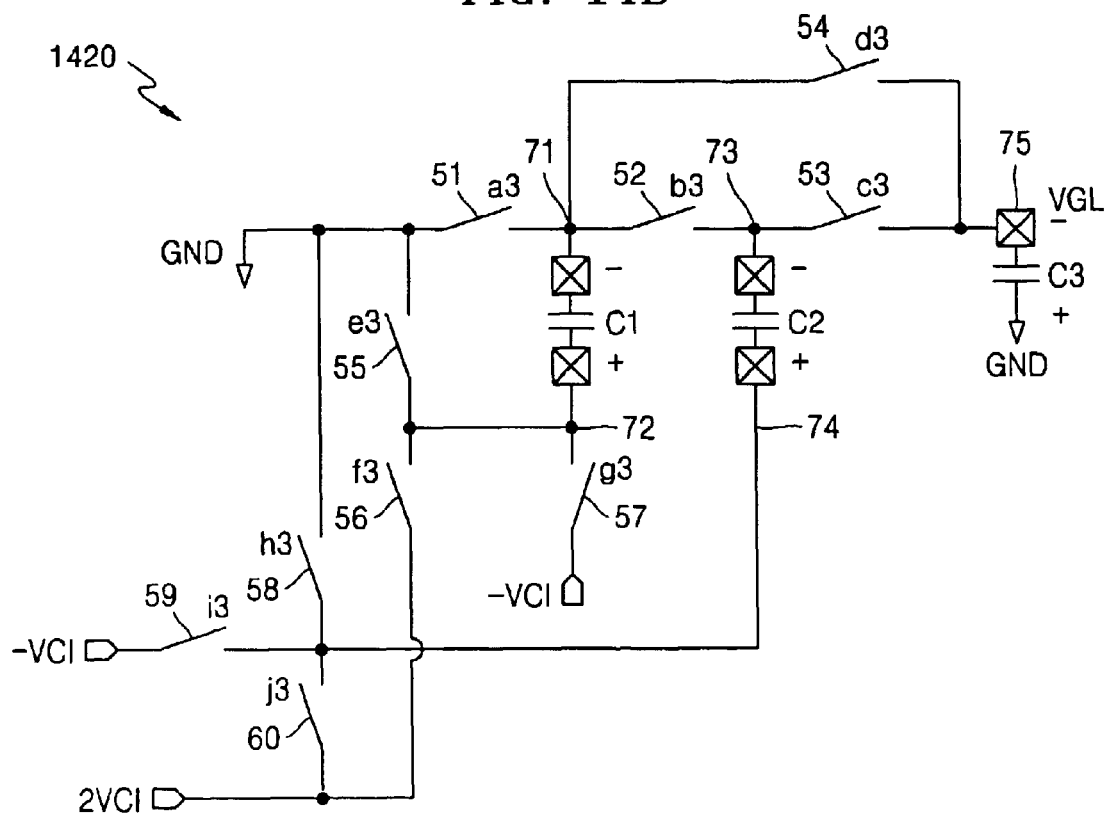

Alternatively, the boosting circuit 300 comprises, as shown in FIGS. 14A and 14B, separate capacitors subjected to two-phase control of each of step-up switch control signals a2 through i2 and step-down switch control signals a3 through j3. When the phase control signal Q has a two-phase pulse form, the boosting circuit 300 alternately outputs the boosted positive voltages VGH due to the step-up switch control signals a2 through i2 and the boosted negative voltages VGL due to the step-down switch control signals a3 through j3, and when the phase control signal Q has a logic state value form, outputs one of the boosted positive voltages VGH and the boosted negative voltages VGL. In this case, separate capacitors C1 through C3 and the separate switch control signals a2 through i2 and a3 through j3 output the boosted positive voltages VGH and the boosted negative voltages VGL, respectively.

Referring back to FIG. 3, the boosting circuit 300 comprises a first capacitor C1, a second capacitor C2, a third capacitor C3, a fourth capacitor C4, a first switch 21, a second switch 22, a third switch 23, a fourth switch 24, a fifth switch 25, a sixth switch 26, a seventh switch 27, an eighth switch 28, a ninth switch 29, a tenth switch 30, an eleventh switch 31, a twelfth switch 32, a thirteenth switch 33, and a fourteenth switch 34. The switches 21 through 34 are formed as a single type or pass-gate type transistor having a complimentary metal-oxide-semiconductor (CMOS) structure using metal-oxide-semiconductor field effect transistors (MOSFETs).

The first capacitor C1 is connected between a first node 35 and a second node 36. The second capacitor C2 is connected between a third node 37 and a fourth node 38. The third capacitor C3 is connected between a first boosted voltage output node 39 and a third power source GND. The fourth capacitor C4 is connected between a second boosted voltage output node 40 and the third power source GND.

The first switch 21 selectively connects or disconnects a fourth power source −VCI and the first node 35 in response to a logic state of a first control signal a. The second switch 22 selectively connects or disconnects the fourth power source −VCI and the third node 37 in response to a logic state of a second control signal b. The third switch 23 selectively connects or disconnects the third power source GND and the third node 37 in response to a logic state of a third control signal c. The fourth switch 24 selectively connects or disconnects the first node 35 and the first boosted voltage output node 39 in response to a logic state of a fourth control signal d. The fifth switch 25 selectively connects or disconnects the first node 35 and a first power source 2VCI in response to a logic state of a fifth control signal e. The sixth switch 26 selectively connects or disconnects the first node 35 and the third node 37 in response to a logic state of a sixth control signal f. The seventh switch 27 selectively connects or disconnects the third node 37 and the first boosted voltage output node 39 in response to a logic state of a seventh control signal g. The eighth switch 28 selectively connects or disconnects the second node 36 and the first power source 2VCI in response to a logic state of an eighth control signal h. The ninth switch 29 selectively connects or disconnects the second node 36 and the third power source GND in response to a logic state of a ninth control signal i. The tenth switch 30 selectively connects or disconnects the fourth node 38 and the first power source 2VCI in response to a logic state of a tenth control signal j. The eleventh switch 31 selectively connects or disconnects the fourth node 38 and the third power source GND in response to a logic state of an eleventh control signal k. The twelfth switch 32 selectively connects or disconnects the fourth node 38 and a second power source VCI in response to a logic state of a twelfth control signal 1. The thirteenth switch 33 selectively connects or disconnects the fourth node 38 and the second boosted voltage output node 40 in response to a logic state of a thirteenth control signal m. The fourteenth switch 34 selectively connects or disconnects the second node 36 and the second boosted voltage output node 40 in response to a logic state of a fourteenth control signal n.

The first through fourteenth control signals (a through n) are signals belonging to one group of a group of the step-up switch control signals (a through n in the negative booster) and a group of the step-down switch control signals (a through n in the positive booster). That is, when the boosting circuit 300 outputs the boosted positive voltages VGH through the first boosted voltage output node 39, the first control signal a through the fourteenth control signal n belong to the group of the step-up switch control signals (a through n in the positive booster). In addition, when the boosting circuit 300 outputs the boosted negative voltages VGL through the second boosted voltage output node 40, the first control signal a through the fourteenth control signal n belong to the group of the step-down switch control signals (a through n in the negative booster).

The boosted positive voltage VGH output node 39, that is, the first boosted voltage output node 39, and the boosted negative voltage VGL output node 40, that is, the second boosted voltage output node 40, output three types of boosted positive voltages VGH and three types of boosted negative voltages VGL, respectively, in response to the control signals a through n generated differently in accordance with the mode signal MODE. The three types of boosted positive voltages VGH are 4VCI, 5VCI and 6VCI, and the three types of boosted negative voltages VGL are −3VCI, −4VCI and −5VCI.

Figure 4:
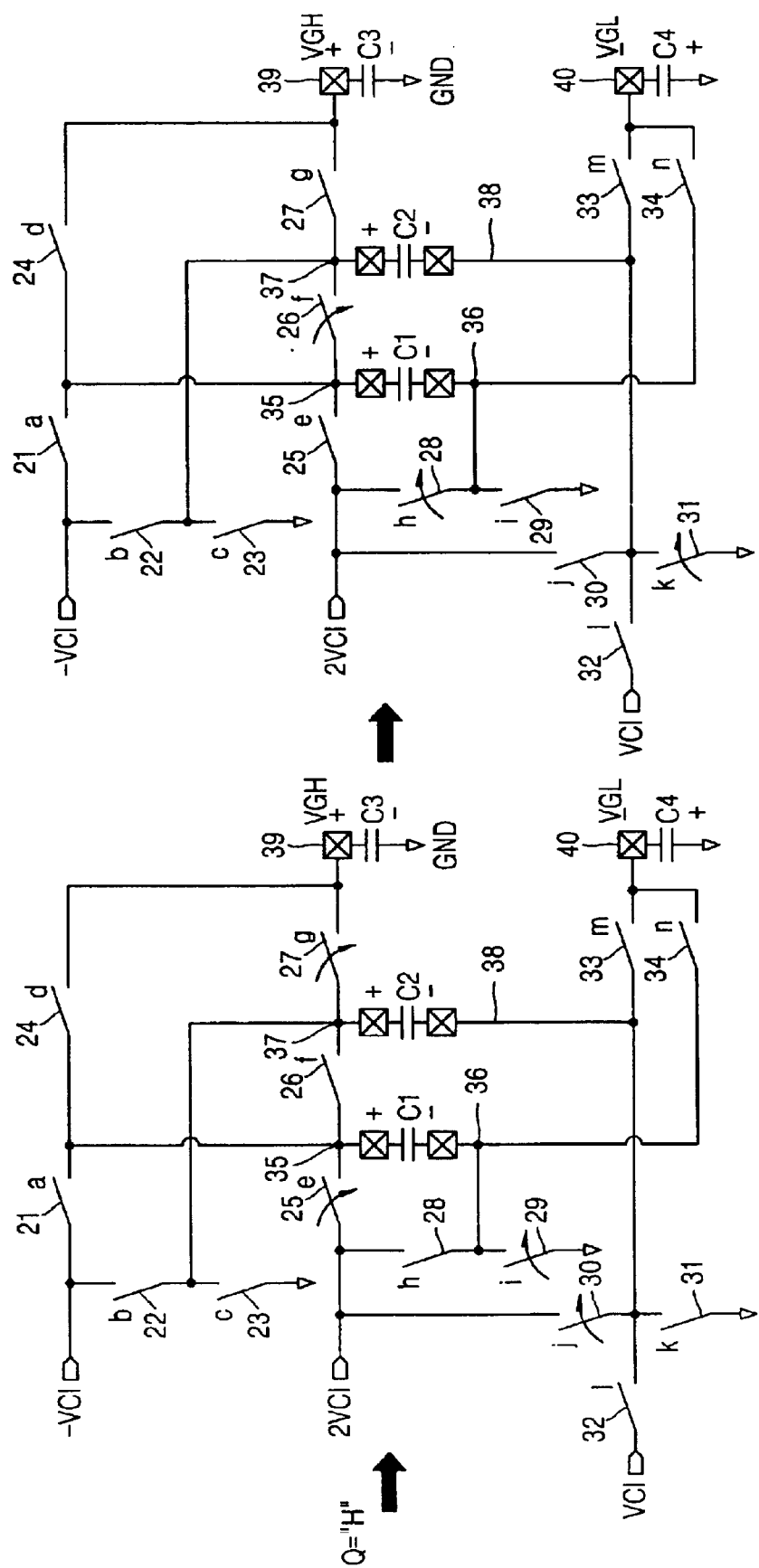
FIG. 4 is a circuit diagram illustrating a switching operation of the circuit shown in FIG. 3 when the circuit outputs a boosted positive voltage, which is six times a source voltage.
Figure 6:
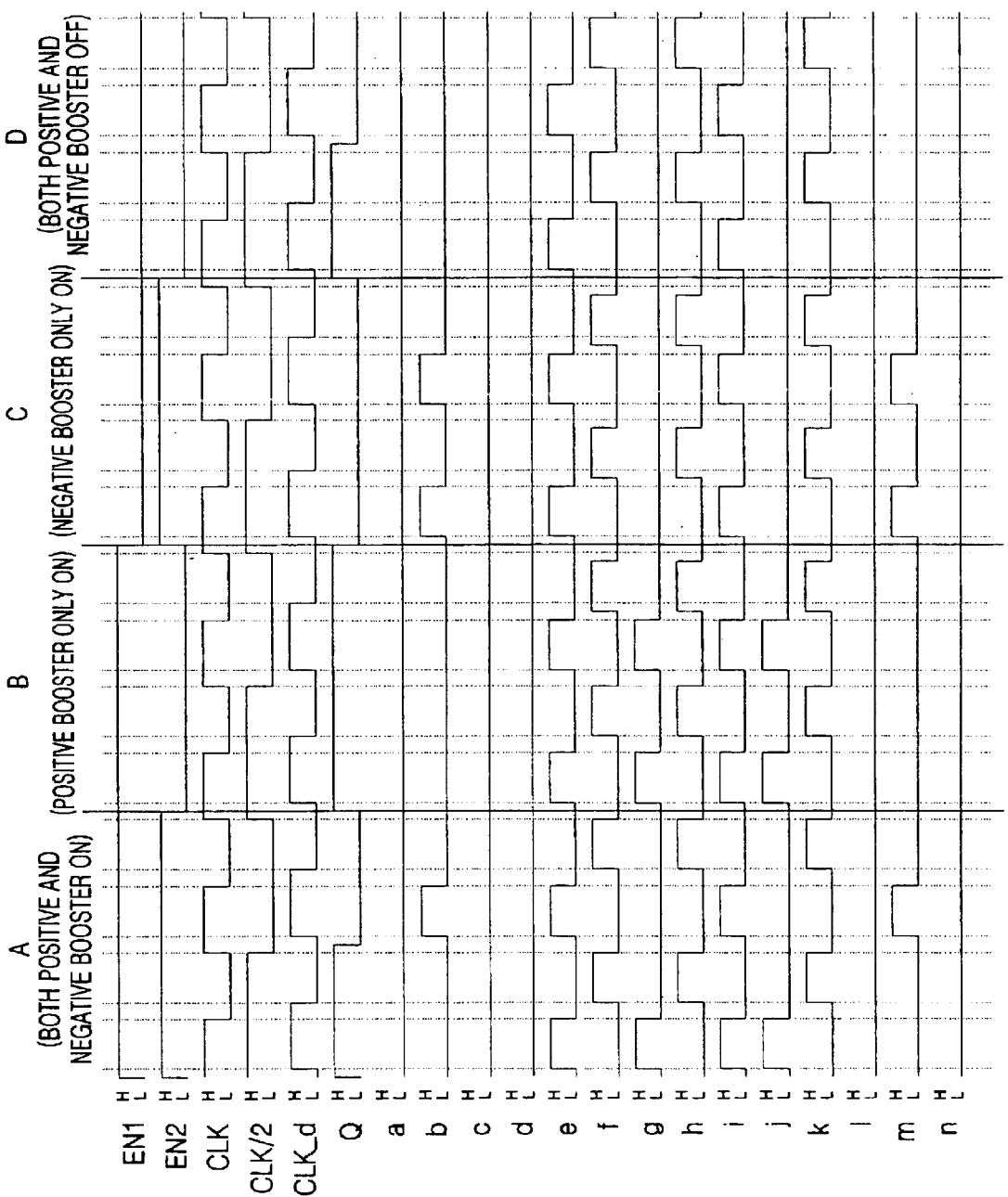
FIG. 6 is a timing chart of the circuit shown in FIG. 3 when the circuit outputs the boosted positive voltage, which is six times the source voltage, and the boosted negative voltage, which is five times the source voltage.

FIG. 4 is a circuit diagram illustrating a switching operation of the boosting circuit 300 shown in FIG. 3 when the boosting circuit 300 outputs the boosted positive voltage 6VCI. FIG. 6 is a timing chart of the boosting circuit 300 shown in FIG. 3 when the boosting circuit 300 outputs the boosted positive voltage 6VCI and the boosted negative voltage −5VCI.

Referring to FIGS. 4 and 6, in a case where the phase control signal Q has a second logic state, when the fifth control signal e, the seventh control signal g, the ninth control signal i and the tenth control signal j of the step-up switch control signals (a through n in the positive booster) turn to the second logic state in an initial phase (in the left circuit diagram of FIG. 4), the fifth switch 25, the seventh switch 27, the ninth switch 29 and the tenth switch 30 are activated to connect both terminals thereof, respectively. As a result, the first node 35 in the first capacitor C1 is charged to 2VCI, and the boosted positive voltage VGH, which is six times the source voltage, is output from the first boosted voltage output node 39. This occurs when the third node 37 in the second capacitor C2 is charged to 2VCI in a previous phase. That is, when the sixth control signal f, the eighth control signal h and the eleventh control signal k of the step-up switch control signals (a through n in the positive booster) turn to the second logic state in the previous phase (in the right circuit diagram of FIG. 4) in order to output the boosted positive voltage VGH from the first boosted voltage output node 39, the sixth switch 26, the eighth switch 28 and the eleventh switch 31 are activated to connect both terminals thereof, respectively. Therefore, the third node 37 in the second capacitor C2 is charged to 2VCI.

Figure 5:
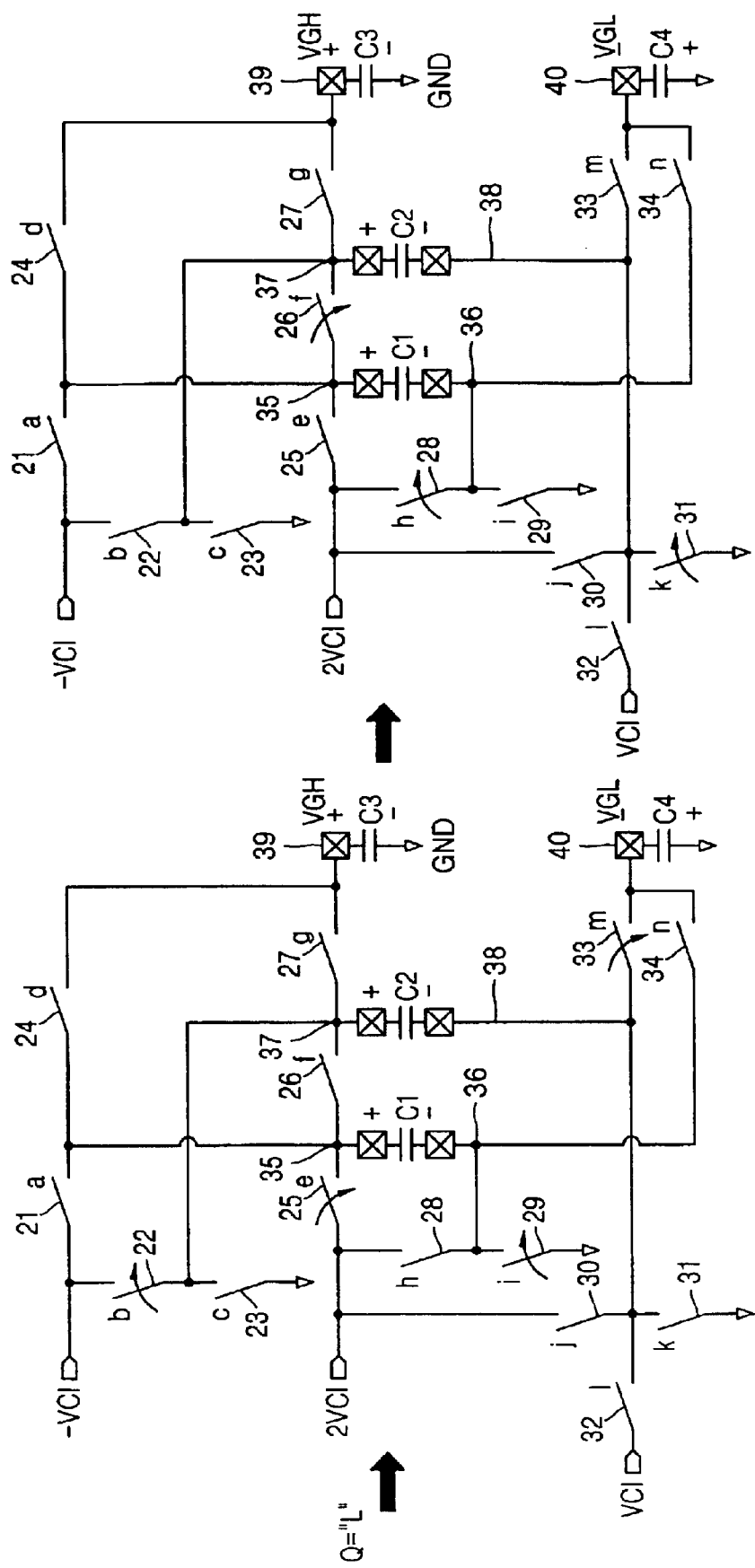
FIG. 5 is a circuit diagram illustrating a switching operation of the circuit shown in FIG. 3 when the circuit outputs a boosted negative voltage, which is five times the source voltage.

FIG. 5 is a circuit diagram illustrating a switching operation of the boosting circuit 300 shown in FIG. 3 when the boosting circuit 300 outputs a boosted negative voltage −5VCI.

Referring to FIGS. 5 and 6, in a case where the phase control signal Q has a first logic state, when the second control signal b, the fifth control signal e, the ninth control signal i and the thirteenth control signal m of the step-down switch control signals (a through n in the negative booster) turn to the second logic state in the initial phase (in the left circuit diagram of FIG. 5), the second switch 22, the fifth switch 25, the ninth switch 29 and the thirteenth switch 33 are activated to connect both terminals thereof, respectively. As a result, the first node 35 in the first capacitor C1 is charged to 2VCI, and the boosted negative voltage VGL, which five times the source voltage, is output from the second boosted voltage output node 40. This occurs when the third node 37 in the second capacitor C2 is charged to 4VCI in a previous phase. That is, when the sixth control signal f, the eighth control signal h and the eleventh control signal k of the step-down switch control signals (a through n in the negative booster) turn to the second logic state in the previous phase (in the right circuit diagram of FIG. 5) in order to output the boosted negative voltage VGL from the second boosted voltage output node 40, the sixth switch 26, the eighth switch 28 and the eleventh switch 31 are activated to connect both terminals thereof, respectively. Therefore, the third node 37 in the second capacitor C2 is charged to 4VCI.

When the step-down switch control signals (a through n in the negative booster) or the step-up switch control signals (a through n in the positive booster) are generated by means of a user's mode setting, as shown in FIG. 6, the boosting circuit 300 shown in FIG. 3 outputs the boosted positive voltage 6VCI and the boosted negative voltage −5VCI. At this time, as described above, the timing of the step-down switch control signals (a through n in the negative booster) or the step-up switch control signals (a through n in the positive booster) are determined on the basis of the phase control signal Q generated differently in accordance with four logic combinations of the first enable signal EN1 and the second enable signal EN2. That is, when the first enable signal EN1 and the second enable signal EN2 have the second logic state, and the phase control signal Q is generated in the two-phase pulse form, the boosting circuit 300 alternately outputs the boosted positive voltage VGH by the step-up switch control signals (a-n in the positive booster) and the boosted negative voltage VGL by the step-down switch control signals (a through n in the negative booster).

When the phase control signal Q has the first logic state, the boosting circuit 300 outputs only the boosted positive voltage VGH, which is six times the source voltage. Similarly, when the phase control signal Q has the second logic state, the boosting circuit 300 outputs only the boosted negative voltage VGL, which is five times the source voltage. In a case where the first enable signal EN1 and the second enable signal EN2 both have the first logic state, that is, in a case where the loads connected to the boosted positive voltage VGH and the boosted negative voltage VGL are small, the phase control signal Q may be generated in a two-phase pulse form or in other forms. In this case, for example, some signals b and m of the step-down switch control signals (a through n in the negative booster) and some signals, for example, g and j of the step-up switch control signals (a through n in the positive booster) are not activated to prevent generation of the boosted positive voltages VGH and the boosted negative voltages VGL.

FIGS. 7 through 13 are timing charts illustrating the timing of the first enable signal EN1, the second enable signal EN2, the clock signals CLK, CLK/2, CLK_d, the phase control signal Q, and the step-down switch control signals (a through n in the negative booster) or the step-up switch control signals (a through n in the positive booster), when the boosting circuit 300 of FIG. 3 outputs the boosted positive voltage VGH having different magnitudes and the boosted negative voltages VGL having different magnitudes.

Figure 7:
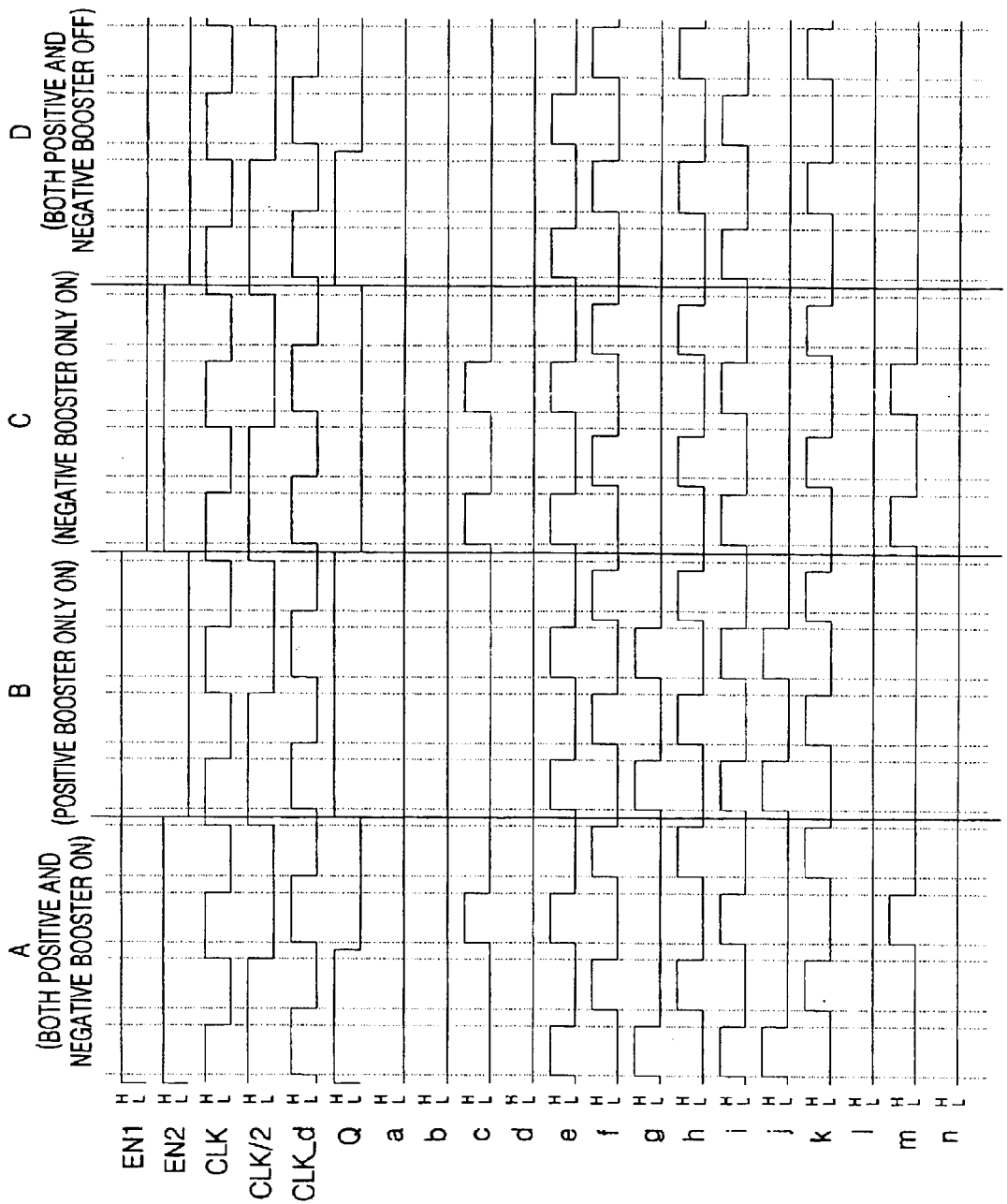
FIG. 7 is a timing chart of the circuit shown in FIG. 3 when the circuit outputs the boosted positive voltage, which is six times the source voltage, and a boosted negative voltage, which is four times the source voltage.

FIG. 7 is a timing chart of the boosting circuit 300 shown in FIG. 3 when the boosting circuit 300 outputs the boosted positive voltage 6VCI and the boosted negative voltage −4VCI. That is, the timing of the step-down switch control signals (a through n in the negative booster) or the step-up switch control signals (a through n in the positive booster) when the boosting circuit 300 outputs the boosted positive voltage 6VCI and the boosted negative voltage −4VCI by means of a user's mode setting are shown in FIG. 7. At this time, as described above with reference to FIG. 6, the timing of the step-down switch control signals (a through n in the negative booster) or the step-up switch control signals (a through n in the positive booster) are determined on the basis of the phase control signal Q generated differently in accordance with four logic combinations of the first enable signal EN1 and the second enable signal EN2. That is, when the first enable signal EN1 and the second enable signal EN2 have the second logic state, and the phase control signal Q is generated in the two-phase pulse form, the boosting circuit 300 alternately outputs the boosted positive voltage VGH, which is six times the source voltage, by the step-up switch control signals (a through n in the positive booster) and the boosted negative voltage VGL, which is four times the source voltage, by the step-down switch control signals (a through n in the negative booster).

When the phase control signal Q has the first logic state, the boosting circuit 300 outputs only the boosted positive voltage VGH. Similarly, when the phase control signal Q has the second logic state, the boosting circuit 300 outputs only the boosted negative voltage VGL. In a case where the first enable signal EN1 and the second enable signal EN2 have the first logic state, some signals, for example, c and m of the step-down switch control signals (a through n in the negative booster) and some signals, for example, g and j of the step-up switch control signals (a through n in the positive booster) are not activated to prevent generation of the boosted positive voltages VGH and the boosted negative voltages VGL.

Figure 8:
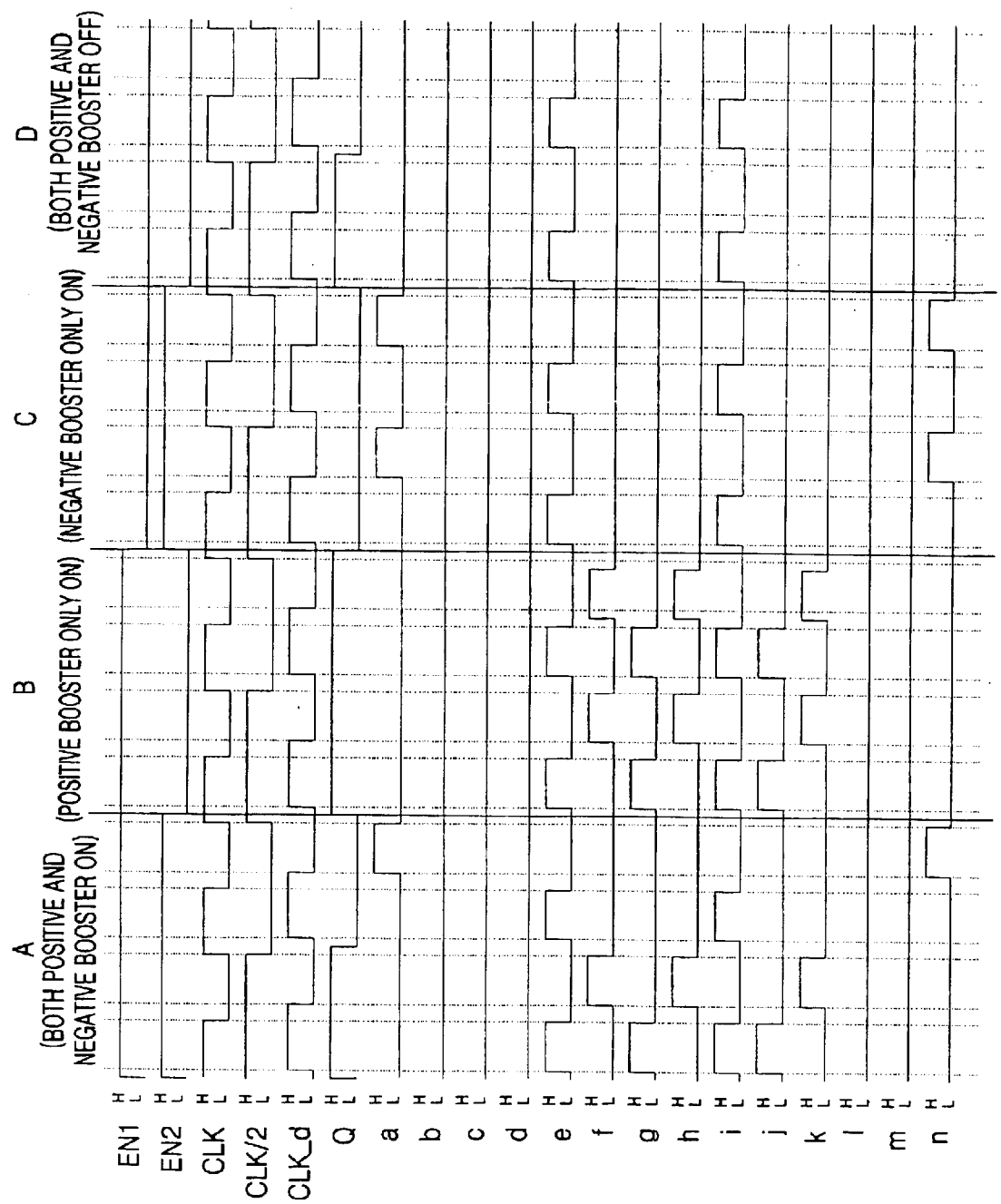
FIG. 8 is a timing chart of the circuit shown in FIG. 3 when the circuit outputs the boosted positive voltage, which is six times the source voltage, and a boosted negative voltage, which is three times the source voltage.

FIG. 8 is a timing chart of the boosting circuit 300 shown in FIG. 3 when the boosting circuit 300 outputs the boosted positive voltage 6VCI and the boosted negative voltage −3VCI. That is, the timing of the step-down switch control signals (a through n in the negative booster) or the step-up switch control signals (a through n in the positive booster) when the boosting circuit 300 outputs the boosted positive voltage 6VCI and the boosted negative voltage −3VCI by means of a user's mode setting are shown in FIG. 8.

Figure 9:
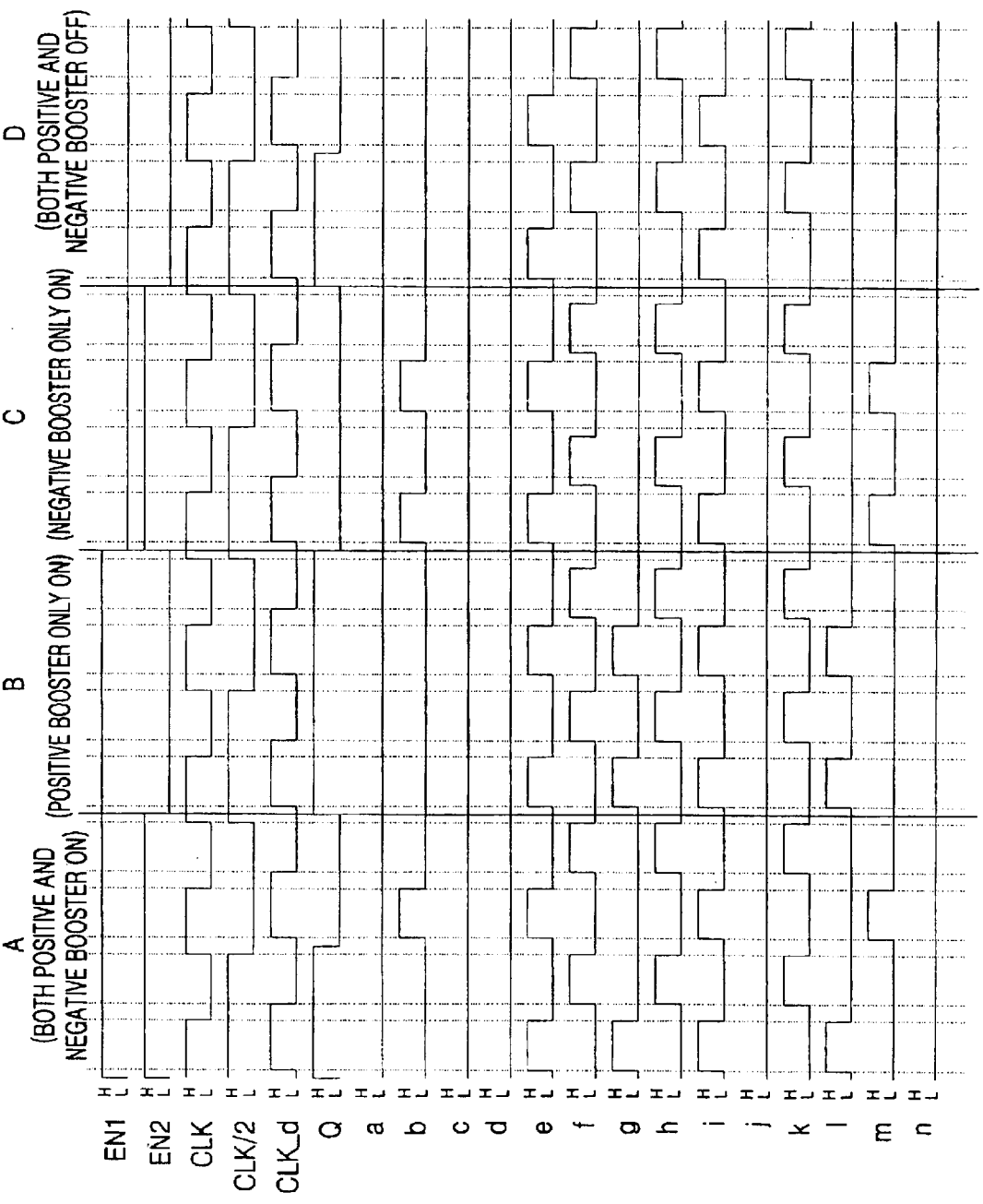
FIG. 9 is a timing chart of the circuit shown in FIG. 3 when the circuit outputs a boosted positive voltage, which is five times the source voltage, and the boosted negative voltage, which is five times the source voltage.

FIG. 9 is a timing chart of the boosting circuit 300 shown in FIG. 3 when the boosting circuit 300 outputs the boosted positive voltage 5VCI and the boosted negative voltage −5VCI. That is, the timing of the step-down switch control signals (a through n in the negative booster) or the step-up switch control signals (a through n in the positive booster) when the boosting circuit 300 outputs the boosted positive voltage 5VCI and the boosted negative voltage −5VCI by means of a user's mode setting are shown in FIG. 9.

Figure 10:
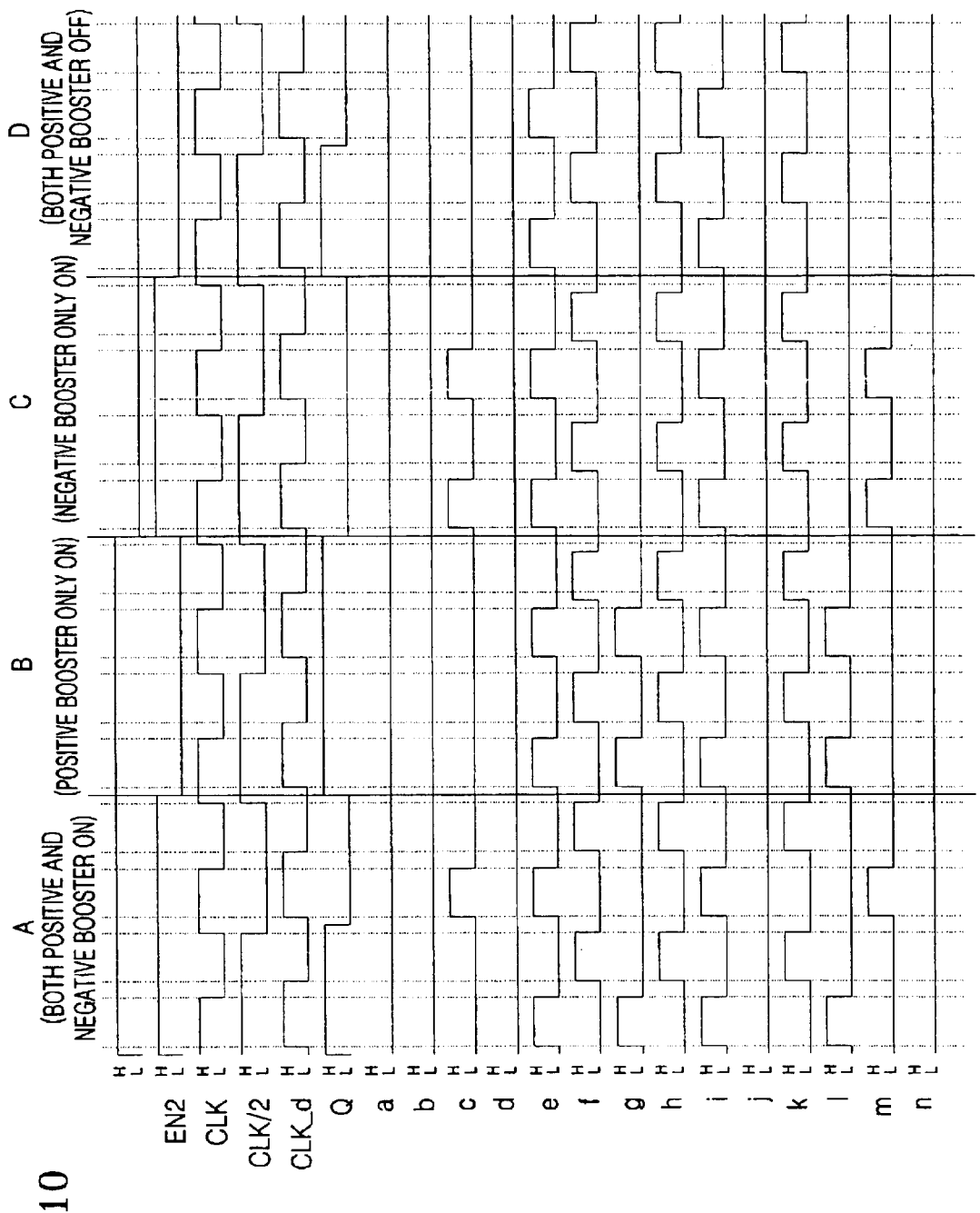
FIG. 10 is a timing chart of the circuit shown in FIG. 3 when the circuit outputs the boosted positive voltage, which is five times the source voltage, and the boosted negative voltage, which is four times the source voltage.

FIG. 10 is a timing chart of the boosting circuit 300 shown in FIG. 3 when the boosting circuit 300 outputs the boosted positive voltage 5VCI and the boosted negative voltage −4VCI. That is, the timing of the step-down switch control signals (a through n in the negative booster) or the step-up switch control signals (a through n in the positive booster) when the boosting circuit 300 outputs the boosted positive voltage 5VCI and the boosted negative voltage −4VCI by means of a user's mode setting are shown in FIG. 10.

Figure 11:
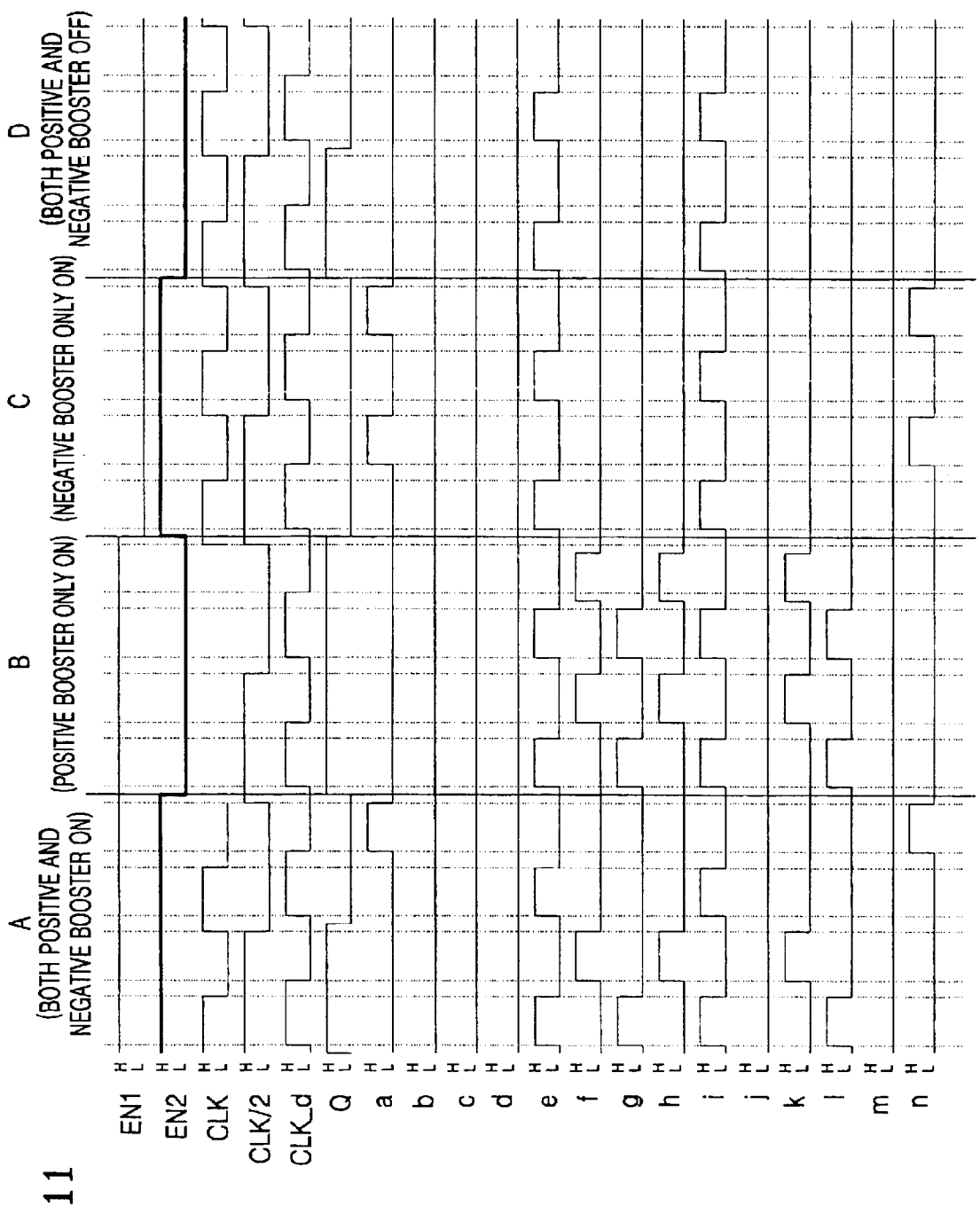
FIG. 11 is a timing chart of the circuit shown in FIG. 3 when the circuit outputs the boosted positive voltage, which is five times the source voltage, and the boosted negative voltage, which is three times the source voltage.

FIG. 11 is a timing chart of the boosting circuit 300 shown in FIG. 3 when the boosting circuit 300 outputs the boosted positive voltage 5VCI and the boosted negative voltage −3VCI. That is, the timing of the step-down switch control signals (a through n in the negative booster) or the step-up switch control signals (a through n in the positive booster) when the boosting circuit 300 outputs the boosted positive voltage 5VCI and the boosted negative voltage −3VCI by means of a user's mode setting are shown in FIG. 11.

Figure 12:
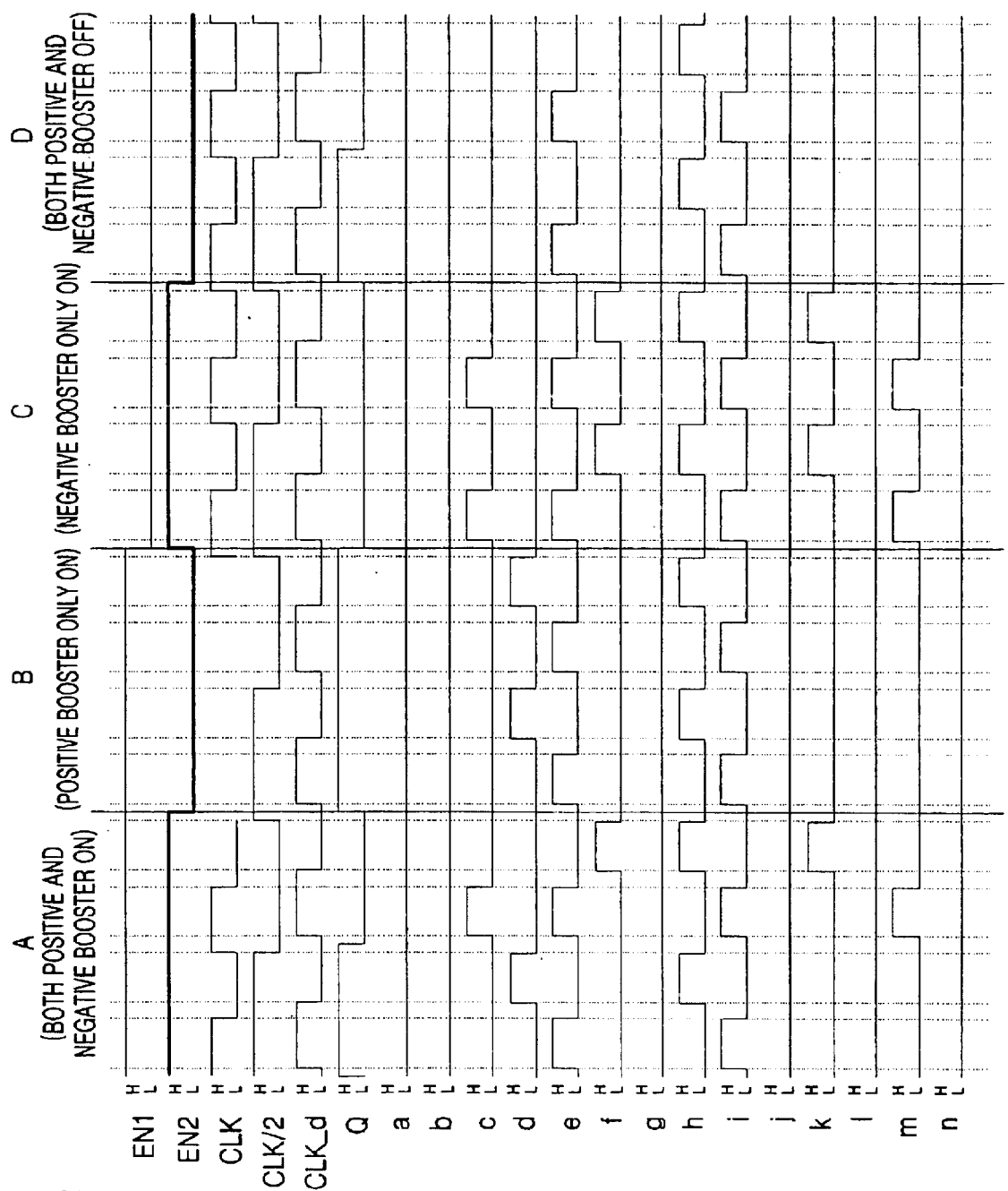
FIG. 12 is a timing chart of the circuit shown in FIG. 3 when the circuit outputs a boosted positive voltage which is four times the source voltage and the boosted negative voltage which is four times the source voltage.

FIG. 12 is a timing chart of the boosting circuit 300 shown in FIG. 3 when the boosting circuit 300 outputs the boosted positive voltage 4VCI and the boosted negative voltage −4VCI. That is, the timing of the step-down switch control signals (a through n in the negative booster) or the step-up switch control signals (a through n in the positive booster) when the boosting circuit 300 outputs the boosted positive voltage 4VCI and the boosted negative voltage −4VCI by means of a user's mode setting are shown in FIG. 12.

Figure 13:
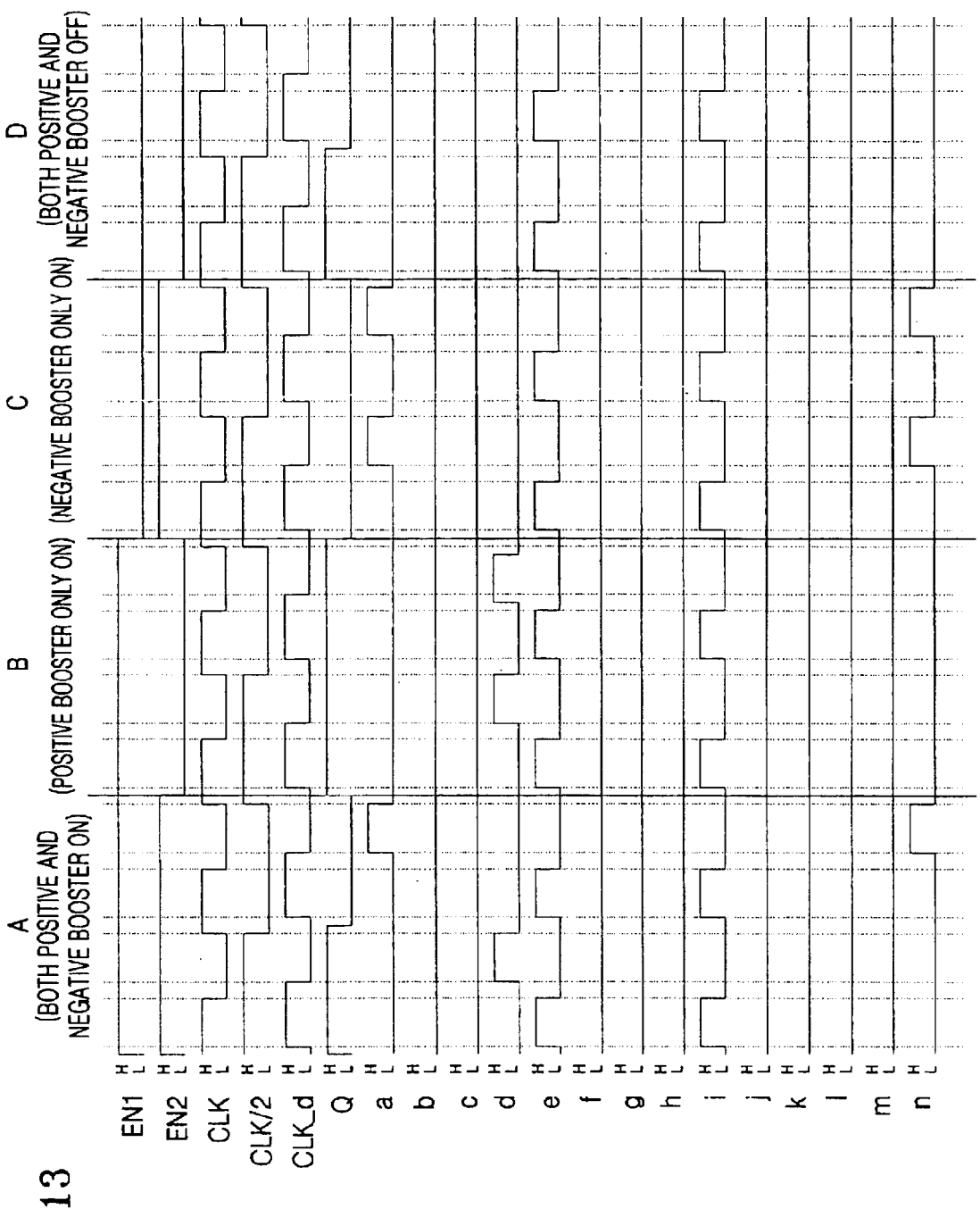
FIG. 13 is a timing chart of the circuit shown in FIG. 3 when the circuit outputs the boosted positive voltage, which is four times the source voltage, and the boosted negative voltage, which is three times the source voltage.

FIG. 13 is a timing chart of the boosting circuit 300 shown in FIG. 3 when the boosting circuit 300 outputs the boosted positive voltage 4VCI and the boosted negative voltage −3VCI. That is, the timing of the step-down switch control signals (a through n in the negative booster) or the step-up switch control signals (a through n in the positive booster) when the boosting circuit 300 outputs the boosted positive voltage 4VCI and the boosted negative voltage −3VCI by means of a user's mode setting are shown in FIG. 13.

FIGS. 14A and 14B are first and second circuit diagrams illustrating the boosting circuit 300 shown in FIG. 2. Referring to FIGS. 14A and 14B, a boosting circuit according to another embodiment of the present invention comprises a positive boosting circuit 1410 (FIG. 14A), which outputs boosted positive voltages VGH by means of first capacitors subjected to two-phase control of step-up switch control signals a2 through i2, and a negative boosting circuit 1420 (FIG. 14B), which outputs boosted negative voltages VGL by means of second capacitors subjected to two-phase control of step-down switch control signals a3 through j3.

Referring to FIG. 14A, the positive boosting circuit 1410 comprises a first capacitor C1, a second capacitor C2, a third capacitor C3, a first switch 41, a second switch 42, a third switch 43, a fourth switch 44, a fifth switch 45, a sixth switch 46, a seventh switch 47, an eighth switch 48, and a ninth switch 49.

The first capacitor C1 is connected between a first node 61 and a second node 62. The second capacitor C2 is connected between a third node 63 and a fourth node 64. The third capacitor C3 is connected between a boosted voltage output node 65 and a third power source GND.

The first switch 41 selectively connects or disconnects the first node 61 and a first power source 2VCI in response to a logic state of a first control signal a2. The second switch 42 selectively connects or disconnects the first node 61 and the third node 63 in response to a logic state of a second control signal b2. The third switch 43 selectively connects or disconnects the third node 63 and the boosted voltage output node 65 in response to a logic state of a third control signal c2. The fourth switch 44 selectively connects or disconnects the first node 61 and the boosted voltage output node 65 in response to a logic state of a fourth control signal d2. The fifth switch 45 selectively connects or disconnects the second node 62 and the first power source 2VCI in response to a logic state of a fifth control signal e2. The sixth switch 46 selectively connects or disconnects the second node 62 and the third power source GND in response to a logic state of a sixth control signal f2. The seventh switch 47 selectively connects or disconnects the fourth node 64 and the first power source 2VCI in response to a logic state of a seventh control signal g2. The eighth switch 48 selectively connects or disconnects the fourth node 64 and a second power source VCI in response to a logic state of an eighth control signal h2. The ninth switch 49 selectively connects or disconnects the fourth node 64 and the third power source GND in response to a logic state of a ninth control signal i2.

As shown in FIG. 14A, the first control signal a2 through the ninth control signal i2 correspond to the step-up switch control signals described above with reference to FIG. 2.

Referring to FIG. 14B, the negative boosting circuit 1420 comprises a first capacitor C1, a second capacitor C2, a third capacitor C3, a first switch 51, a second switch 52, a third switch 53, a fourth switch 54, a fifth switch 55, a sixth switch 56, a seventh switch 57, an eighth switch 58, a ninth switch 59, and a tenth switch 60.

The first capacitor C1 is connected between a first node 71 and a second node 72. The second capacitor C2 is connected between a third node 73 and a fourth node 74. The third capacitor C3 is connected between a boosted voltage output node 75 and a third power source GND.

The first switch 51 selectively connects or disconnects the first node 71 and the third power source GND in response to a logic state of a first control signal a3. The second switch 52 selectively connects or disconnects the first node 71 and the third node 73 in response to a logic state of a second control signal b3. The third switch 53 selectively connects or disconnects the third node 73 and the boosted voltage output node 75 in response to a logic state of a third control signal c3. The fourth switch 54 selectively connects or disconnects the first node 71 and the boosted voltage output node 75 in response to a logic state of a fourth control signal d3. The fifth switch 55 selectively connects or disconnects the second node 72 and the third power source GND in response to a logic state of a fifth control signal e3. The sixth switch 56 selectively connects or disconnects the second node 72 and a first power source 2VCI in response to a logic state of a sixth control signal f3. The seventh switch 57 selectively connects or disconnects the second node 72 and a second power source −VCI in response to a logic state of a seventh control signal g3. The eighth switch 58 selectively connects or disconnects the fourth node 74 and the third power source GND in response to a logic state of an eighth control signal h3. The ninth switch 59 selectively connects or disconnects the fourth node 74 and the second power source −VCI in response to a logic state of a ninth control signal i3. The tenth switch 60 selectively connects or disconnects the fourth node 74 and the first power source 2VCI in response to a logic state of a tenth control signal j3.

As shown in FIG. 14B, the first control signal a3 through the tenth control signal j3 correspond to the step-down switch control signals described above with reference to FIG. 2.

In FIGS. 14A and 14B, the switches (41 through 49 and 51 through 60) are formed into a single type or a pass-gate type transistor having a CMOS structure using MOSFETs. In FIG. 14A, the boosted voltage output node 65 outputs three types of boosted positive voltages VGH, that is, 4VCI, 5VCI and 6VCI, in response to the control signals a2 through i2 generated differently in accordance with the mode signal MODE of FIG. 2. In FIG. 14B, the boosted voltage output node 75 outputs three types of boosted negative voltages VGL, that is, −3VCI, −4VCI and −5VCI, in response to the control signals a3 through j3 generated differently in accordance with the mode signal MODE of FIG. 2.

Figure 15:
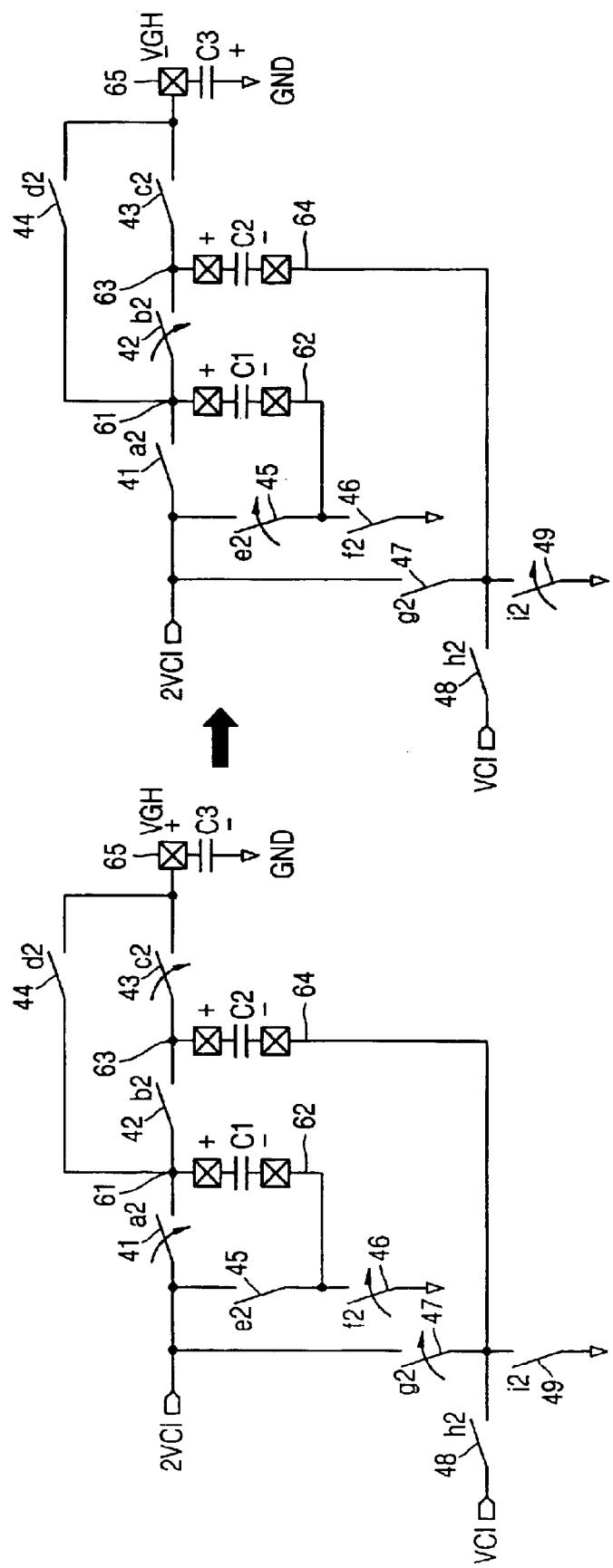
FIG. 15 is a circuit diagram illustrating a switching operation of the first circuit shown in FIG. 14A when the first circuit outputs the boosted positive voltage, which is six times the source voltage.
Figure 16:
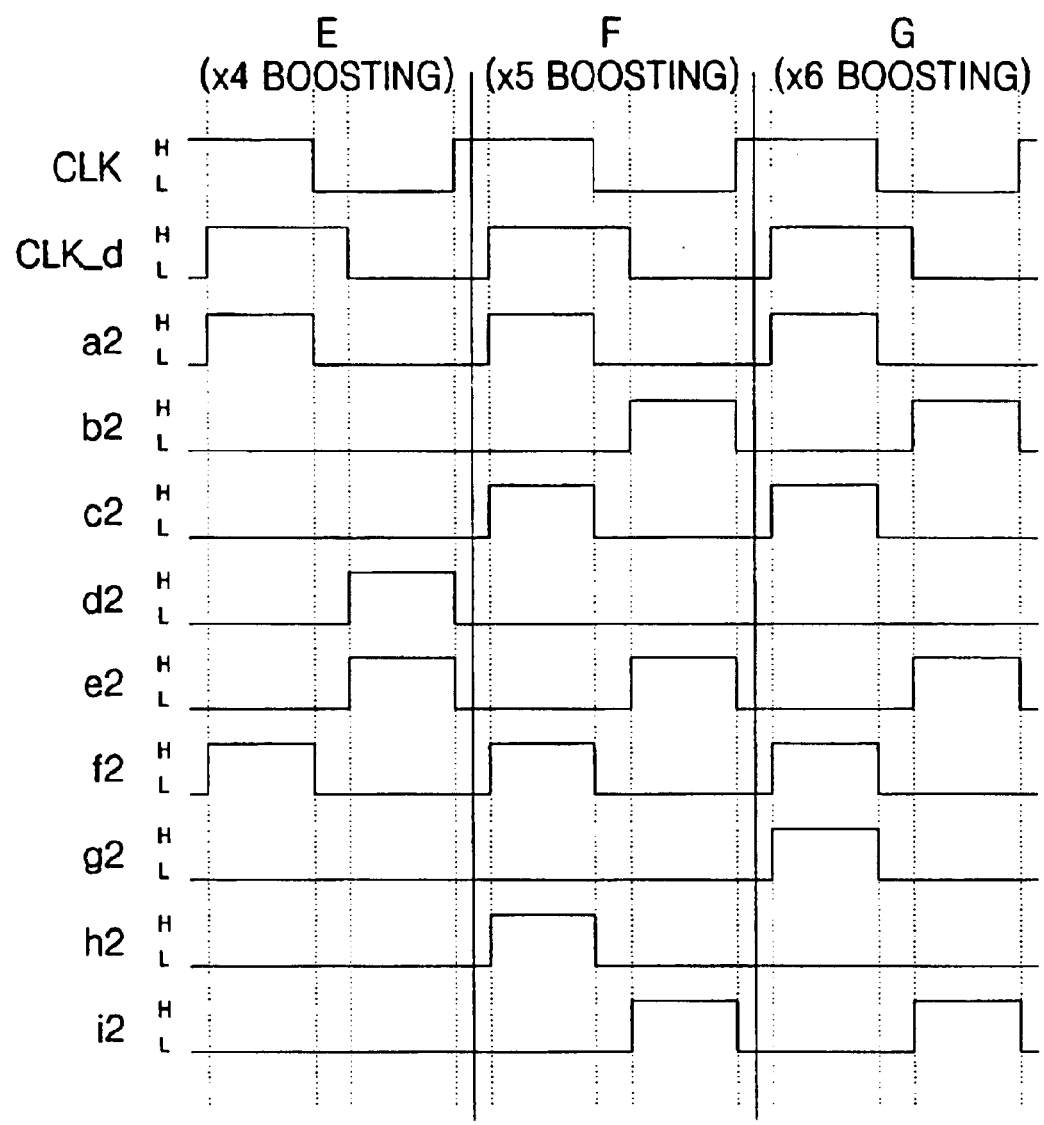
FIG. 16 is a timing chart of the first circuit shown in FIG. 14A when the first circuit outputs the boosted positive voltage, which is four times the source voltage, the boosted positive voltage, which is five times the source voltage, and the boosted positive voltage, which is six times the source voltage.

FIG. 15 is a circuit diagram illustrating a switching operation of the positive boosting circuit 1410 shown in FIG. 14A when the positive boosting circuit 1410 outputs the boosted positive voltage 6VCI. FIG. 16 is a timing chart that illustrates when the positive boosting circuit 1410 shown in FIG. 14A outputs the boosted positive voltage 4VCI, the boosted positive voltage 5VCI, and the boosted positive voltage 6VCI.

In FIG. 16, the first enable signal EN1, the second enable signal EN2 and the phase control signal Q as previously shown in FIGS. 6 through 13 are omitted, and the timing of the step-up switch control signals a2 through i2 and clock signals CLK, CLK_d different from those of FIGS. 6 through 13 are shown. When the positive boosting circuit 1410 is used, the switch control signal generator 220 shown in FIG. 2 generates the step-up switch control signals a2 through i2 using the clock signals CLK and CLK_d of FIG. 16.

Referring to section G of the timing chart of FIG. 16, when the boosted positive voltage 6VCI is output as shown in FIG. 15, in a case where the phase control signal Q of FIG. 2 has a first logic state, when the first control signal a2, the third control signal c2, the sixth control signal f2 and the seventh control signal g2 of the step-up switch control signals a2 through i2 turn to the second logic state in an initial phase (in the left circuit diagram of FIG. 15), the first switch 41, the third switch 43, the sixth switch 46 and the seventh switch 47 are activated to connect both terminals thereof, respectively. As a result, the first node 61 of the first capacitor C1 is charged to 2VCI, and the boosted positive voltage VGH, which is six times the source voltage, is output from the boosted voltage output node 65. This occurs because the third node 63 of the second capacitor C2 is charged to 4VCI in a previous phase. That is, when the second control signal b2, the fifth control signal e2 and the ninth control signal i2 of the step-up switch control signals a2 through i2 turn to the second logic state in the previous phase (in the right circuit diagram of FIG. 15) in order to output the boosted positive voltage VGH from the boosted voltage output node 65, the second switch 42, the fifth switch 45 and the ninth switch 49 are activated to connect both terminals thereof, respectively. Therefore, the third node 63 of the second capacitor C2 is charged to 4VCI.

Figure 17:
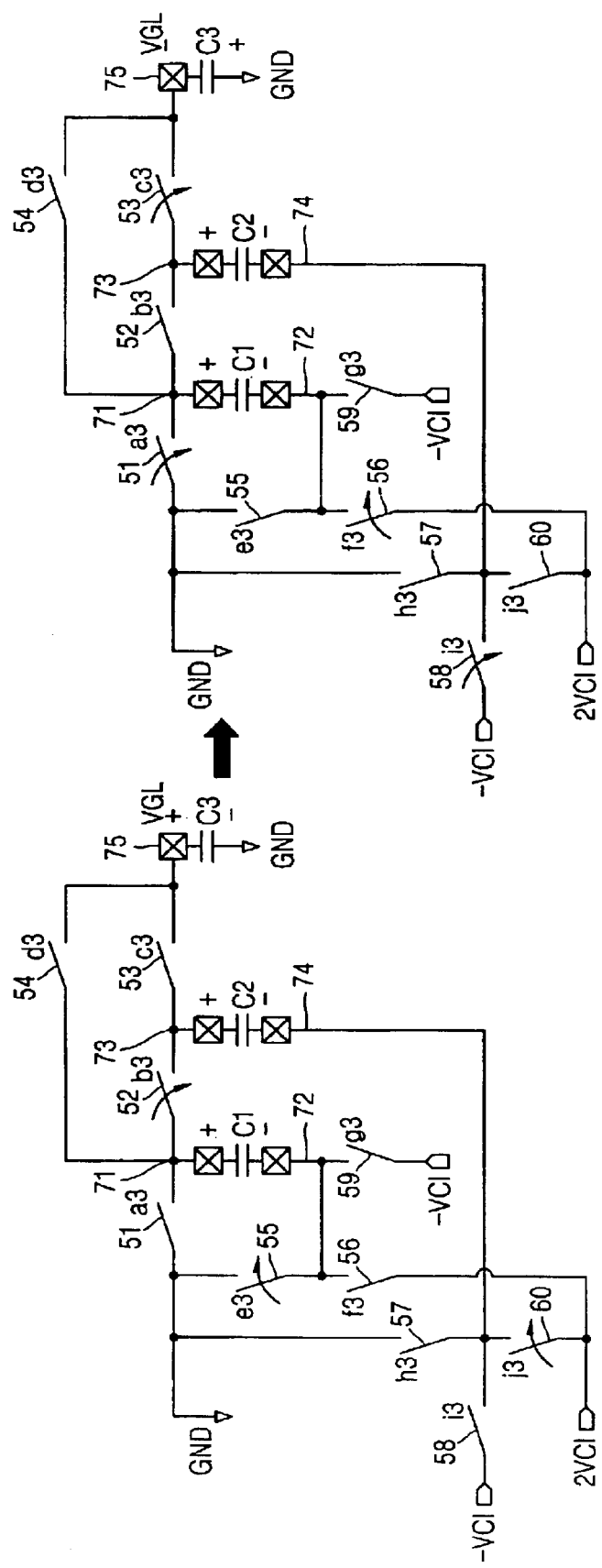
FIG. 17 is a timing chart of the second circuit shown in FIG. 14B when the second circuit outputs the boosted negative voltage, which is five times the source voltage.
Figure 18:
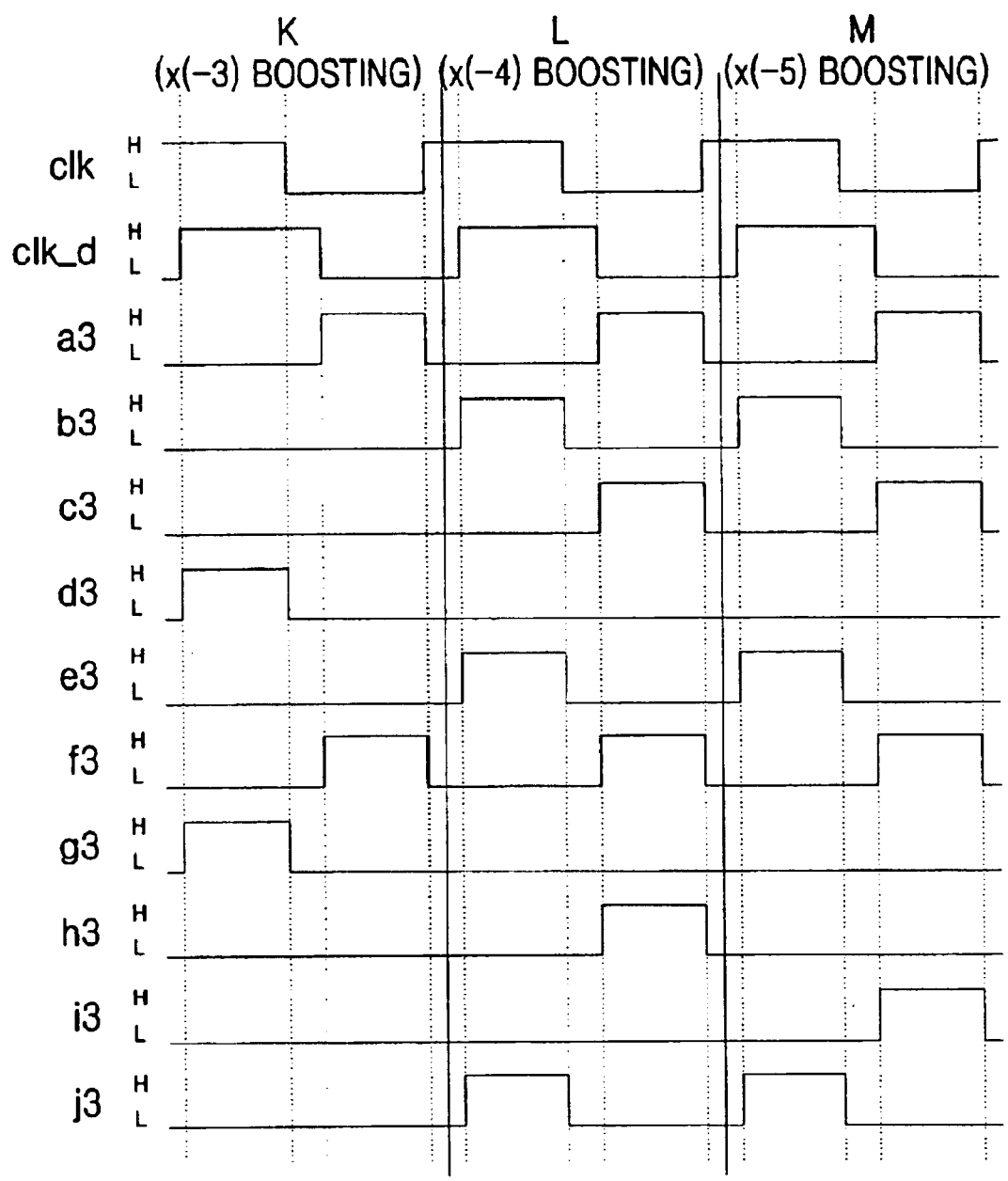
FIG. 18 is a timing chart of the second circuit shown in FIG. 14B when the second circuit outputs the boosted negative voltage, which is three times the source voltage, the boosted negative voltage, which is four times the source voltage, and the boosted negative voltage, which is five times the source voltage.

FIG. 17 is a circuit diagram illustrating a switching operation of the negative boosting circuit 1420 shown in FIG. 14B when the negative boosting circuit 1420 outputs the boosted negative voltage −5VCI. FIG. 18 is a timing chart that illustrates when the negative boosting circuit 1420 shown in FIG. 14B outputs the boosted negative voltage −3VCI, the boosted negative voltage −4VCI, and the boosted negative voltage −5VCI.

In FIG. 18, the first enable signal EN1, the second enable signal EN2 and the phase control signal Q as previously shown in FIGS. 6 through 13 are omitted, and the timing of the step-down switch control signals a3 through j3 and clock signals CLK, CLK_d as shown in FIG. 16 are shown. When the negative boosting circuit 1420 is used, the switch control signal generator 220 shown in FIG. 2 generates the step-down switch control signals a3 through j3 using the clock signals CLK and CLK_d of FIG. 17.

Referring to section M of the timing chart of FIG. 18, when the boosted negative voltage −5VCI is output in FIG. 17, in a case where the phase control signal Q of FIG. 2 has the first logic state, when the second control signal b3, the fifth control signal e3 and the tenth control signal j3 of the step-down switch control signals a3 through j3 turn to the second logic state in an initial phase (in the left circuit diagram of FIG. 17), the second switch 52, the fifth switch 55 and the tenth switch 60 are activated to connect both terminals thereof, respectively. As a result, the third node 73 in the second capacitor C2 is charged to −2VCI. This occurs because the first node 71 in the first capacitor C1 is charged to GND (0) in a previous phase. That is, when the first control signal a3, the third control signal c3, the sixth control signal f3 and the eighth control signal h3 of the step-down switch control signals a3 through j3 turn to the second logic state in the previous phase (in the right circuit diagram of FIG. 17) in order to output the boosted negative voltage VGL from the boosted voltage output node 75, the first switch 51, the third switch 53, the sixth switch 56 and the eighth switch 58 are activated to connect both terminals thereof, respectively. Therefore, the first node 71 in the first capacitor C1 is charged to GND (0), and the boosted negative voltage VGL is output from the boosted voltage output node 75.

When the step-up switch control signals a2 through i2 and the step-down switch control signals a3 through j3 are generated by means of a user's mode setting, as shown in the section G of the timing chart of FIG. 16 when the boosted positive voltage 6VCI is output, and the section M of the timing chart of FIG. 18 when the boosted negative voltage −5VCI is output, the positive and negative boosting circuits 1410 and 1420 output the boosted positive voltage 6VCI and the boosted negative voltage −5VCI, respectively. At this time, as described with reference to FIG. 2, the timing of the step-down switch control signals a3 through j3 or the step-up switch control signals a2 through i2 are determined on the basis of the phase control signal Q generated differently in accordance with four logic combinations of the first enable signal EN1 and the second enable signal EN2. That is, when the first enable signal EN1 and the second enable signal EN2 have the second logic state, and the phase control signal Q is thus generated in the two-phase pulse form as shown in FIG. 6, the positive boosting circuit 1410 shown in FIG. 14A outputs the boosted positive voltage VGH, which is six times the source voltage, by the step-up switch control signals a2 through i2 and the negative boosting circuit 1420 shown in FIG. 14B outputs the boosted negative voltage VGL, which is five times the source voltage, by the step-down switch control signals a3 through j3, alternately.

When the phase control signal Q has the first logic state, the positive boosting circuit 1410 outputs only the boosted positive voltage VGH, which is six times the source voltage. Similarly, when the phase control signal Q has the second logic state, the negative boosting circuit 1420 outputs only the boosted negative voltage VGL, which is five times the source voltage. In a case where the first enable signal EN1 and the second enable signal EN2 both have the first logic state, that is, in a case where the loads connected to the boosted positive voltage VGH and the boosted negative voltage VGL are small, the phase control signal Q may be generated in a two-phase pulse form or in other forms. In this case, a signal, for example, c3 of the step-down switch control signals a3 through j3 and a signal, for example, a2 of the step-up switch control signals a2 through i2 are not activated to prevent generation of the boosted positive voltages VGH and the boosted negative voltages VGL.

Although an operation where the positive and negative boosting circuits 1410 and 1420 output the boosted positive voltage 6VCI and the boosted negative voltage −5VCI, respectively, has been described, an operation where the positive and negative boosting circuits 1410 and 1420 output the other boosted positive voltages 4VCI and 5VCI and the other boosted negative voltages −3VCI and −4VCI, respectively, can be understood by referring to FIGS. 15 through 18. For example, the positive boosting circuit 1410 outputs the boosted positive voltage 4VCI and the boosted positive voltage 5VCI from the boosted voltage output node 65 in accordance with the step-up switch control signals a2 through i2 as shown in a section E of the timing chart of FIG. 16 when the boosted positive voltage 4VCI is output, and a section F of the timing chart of FIG. 16 when the boosted positive voltage 5VCI is output, respectively. Similarly, the negative boosting circuit 1420 outputs the boosted negative voltage −3VCI and the boosted negative voltage −4VCI from the boosted voltage output node 75 in accordance with the step-down switch control signals a3 through j3 as shown in a section K of the timing chart of FIG. 18 when the boosted negative voltage −3VCI is output, and a section L of the timing chart of FIG. 18 when the boosted negative voltage −4VCI is output, respectively.

As described above, in the boosting power supply unit 200 according to an exemplary embodiment of the present invention, when a phase control signal generator 210 outputs the phase control signal Q using the first enable signal EN1 and the second enable signal EN2, the switch control signal generator 220 generates and outputs the step-down switch control signals and the step-up switch control signals corresponding to the phase control signal Q. Accordingly, the boosting circuit 300 outputs the boosted negative voltages VGL and the boosted positive voltages VGH through the capacitors subjected to the two-phase control of the step-down switch control signals and the step-up switch control signals. At this time, the boosting circuit 300 alternately outputs the boosted negative voltage VGL and the boosted positive voltage VGH, outputs one of the boosted negative and positive voltages VGL and VGH, or does not output the boosted negative and positive voltages VGL and VGH, in accordance with the phase control signal Q. The phase control signal Q has four signal forms corresponding to the logic combinations of the first enable signal EN1 and the second enable signal EN2, which turn to the second logic state if the power consumption of the load connected to the boosted positive voltage VGH and the load connected to the boosted negative voltage VGL is increased.

In addition, the boosting power supply unit 200 according to an exemplary embodiment of the present invention comprises the boosting circuit 300 having a small number of externally-mounted capacitors, which generates stepped-up and stepped-down boosted voltages through charging and pumping under two-phase driving, and can control the simultaneous output of the stepped-up voltage and the stepped-down voltage, the output of only the stepped-up voltage, the output of only the stepped-down voltage, and the cut-off of the output of the stepped-up voltage and the stepped-down voltage on the basis of the phase control signal generated from the enable signals of which the logic states are changed in accordance with the amount of load. Therefore, when the boosting power supply unit 200 according to an exemplary embodiment of the present invention is applied to a mobile product requiring the stepped-up or stepped-down voltages, a mobile product having characteristics, such as light, thin and small-sized may be realize due to reduction size of a module, and a longer life span of a battery due to reduced power consumption.

While the present invention has been particularly shown and described with reference to exemplary embodiments thereof, it will be understood by those skilled in the art that various changes in form and details may be made therein without departing from the spirit and scope of the present invention as defined by the following claims and their equivalents.

What is claimed is:

1. A boosting circuit, comprising:
   a first capacitor connected between a first node and a second node;
   a second capacitor connected between a third node and a fourth node;
   a third capacitor connected between a first boosted voltage output node and a third power source;
   a fourth capacitor connected between a second boosted voltage output node and the third power source;
   a first switch which selectively connects or disconnects a fourth power source and the first node in response to a logic state of a first control signal;
   a second switch which selectively connects or disconnects the fourth power source and the third node in response to a logic state of a second control signal;
   a third switch which selectively connects or disconnects the third power source and the third node in response to a logic state of a third control signal;
   a fourth switch which selectively connects or disconnects the first node and the first boosted voltage output node in response to a logic state of a fourth control signal;
   a fifth switch which selectively connects or disconnects the first node and a first power source in response to a logic state of a fifth control signal;
   a sixth switch which selectively connects or disconnects the first node and the third node in response to a logic state of a sixth control signal;
   a seventh switch which selectively connects or disconnects the third node and the first boosted voltage output node in response to a logic state of a seventh control signal;

an eighth switch which selectively connects or disconnects the second node and the first power source in response to a logic state of an eighth control signal;

a ninth switch which selectively connects or disconnects the second node and the third power source in response to a logic state of a ninth control signal;

a tenth switch which selectively connects or disconnects the fourth node and the first power source in response to a logic state of a tenth control signal;

an eleventh switch which selectively connects or disconnects the fourth node and the third power source in response to a logic state of an eleventh control signal;

a twelfth switch which selectively connects or disconnects the fourth node and a second power source in response to a logic state of a twelfth control signal;

a thirteenth switch which selectively connects or disconnects the fourth node and the second boosted voltage output node in response to a logic state of a thirteenth control signal; and a fourteenth switch which selectively connects or disconnects the second node and the second boosted voltage output node in response to a logic state of a fourteenth control signal.

2. The boosting circuit according to claim 1, wherein the switches are formed using metal-oxide-semiconductor field effect transistors (MOSFETs).

3. The boosting circuit according to claim 1, wherein each of the boosted voltage output nodes outputs boosted voltages under two-phase control of the control signals.

4. The boosting circuit according to claim 1, wherein the first boosted voltage output node and the second boosted voltage output node output three boosted positive voltages and three boosted negative voltages in response to the control signals, respectively.

5. A boosting circuit, comprising:

a first capacitor connected between a first node and a second node;

a second capacitor connected between a third node and a fourth node;

a third capacitor connected between a boosted voltage output node and a third power source;

a first switch which selectively connects or disconnects the first node and a first power source in response to a logic state of a first control signal;

a second switch which selectively connects or disconnects the first node and the third node in response to a logic state of a second control signal;

a third switch which selectively connects or disconnects the third node and the boosted voltage output node in response to a logic state of a third control signal;

a fourth switch which selectively connects or disconnects the first node and the boosted voltage output node in response to a logic state of a fourth control signal;

a fifth switch which selectively connects or disconnects the second node and the first power source in response to a logic state of a fifth control signal;

a sixth switch which selectively connects or disconnects the second node and the third power source in response to a logic state of a sixth control signal;

a seventh switch which selectively connects or disconnects the fourth node and the first power source in response to a logic state of a seventh control signal;

an eighth switch which selectively connects or disconnects the fourth node and a second power source in response to a logic state of an eighth control signal; and a ninth switch which selectively connects or disconnects the fourth node and the third power source in response to a logic state of a ninth control signal.

6. The boosting circuit according to claim 5, wherein the switches are formed using metal-oxide-semiconductor field effect transistors (MOSFETs).

7. The boosting circuit according to claim 5, wherein each of the boosted voltage output nodes outputs boosted voltages under two-phase control of the control signals.

8. The boosting circuit according to claim 5, wherein the boosted voltage output node outputs three boosted voltages in response to the control signals.

9. A boosting circuit, comprising:

a first capacitor connected between a first node and a second node;

a second capacitor connected between a third node and a fourth node;

a third capacitor connected between a boosted voltage output node and a third power source;

a first switch which selectively connects or disconnects the first node and the third power source in response to a logic state of a first control signal;

a second switch which selectively connects or disconnects the first node and the third node in response to a logic state of a second control signal;

a third switch which selectively connects or disconnects the third node and the boosted voltage output node in response to a logic state of a third control signal;

a fourth switch which selectively connects or disconnects the first node and the boosted voltage output node in response to a logic state of a fourth control signal;

a fifth switch which selectively connects or disconnects the second node and the third power source in response to a logic state of a fifth control signal;

a sixth switch which selectively connects or disconnects the second node and a first power source in response to a logic state of a sixth control signal;

a seventh switch which selectively connects or disconnects the second node and a second power source in response to a logic state of a seventh control signal;

an eighth switch which selectively connects or disconnects the fourth node and the third power source in response to a logic state of an eighth control signal;

a ninth switch which selectively connects or disconnects the fourth node and the second power source in response to a logic state of a ninth control signal; and a tenth switch which selectively connects or disconnects the fourth node and the first power source in response to a logic state of a tenth control signal.

10. The boosting circuit according to claim 9, wherein the switches are formed using metal-oxide-semiconductor field effect transistors (MOSFETs).

11. The boosting circuit according to claim 9, wherein each of the boosted voltage output nodes outputs boosted voltages under two-phase control of the control signals.

12. The boosting circuit according to claim 9, wherein the boosted voltage output node outputs three boosted voltages in response to the control signals.

13. A boosting power supply unit, comprising:

a phase control signal generator which outputs a phase control signal having one of a two-phase pulse form and a logic state value form in response to each of four logic combinations of a first enable signal and a second enable signal;

a switch control signal generator which generates and outputs two-phase step-down switch control signals corresponding to a mode signal in a first logic state of the phase control signal, and generates and outputs two-phase step-up switch control signals corresponding to the mode signal in a second logic state of the phase control signal; and a boosting circuit which outputs boosted negative voltages by means of capacitors subjected to two-phase control of the step-down switch control signals, and outputs boosted positive voltages by means of capacitors subjected to two-phase control of the step-up switch control signals.

14. The boosting power supply unit according to claim 13, wherein the first enable signal and the second enable signal are digital signals having different logic states with respect to above and below a threshold amount of power in response to amounts of power consumed in loads connected to the boosted positive voltage and the boosted negative voltage, respectively.

15. The boosting power supply unit according to claim 13, wherein when both of the first enable signal and the second enable signal have a first logic state, at least one signal of the step-down switch control signals and at least one signal of the step-up switch control signals are not activated.

16. The boosting power supply unit according to claim 13, wherein the boosting circuit, which comprises shared capacitors subjected to two-phase control of the step-down switch control signals and the step-up switch control signals, alternately outputs the boosted positive voltage by the step-up switch control signals and the boosted negative voltage by the step-down switch control signals when the phase control signal has a two-phase pulse form, and outputs one of the boosted positive voltage and the boosted negative voltage when the phase control signal has a logic state value form.

17. The boosting power supply unit according to claim 16, wherein the boosting circuit, comprises:

a first capacitor connected between a first node and a second node;

a second capacitor connected between a third node and a fourth node;

a third capacitor connected between a boosted positive voltage output node and a third power source;

a fourth capacitor connected between a boosted negative voltage output node and the third power source;

a first switch which selectively connects or disconnects a fourth power source and the first node in response to a logic state of a first control signal;

a second switch which selectively connects or disconnects the fourth power source and the third node in response to a logic state of a second control signal;

a third switch which selectively connects or disconnects the third power source and the third node in response to a logic state of a third control signal;

a fourth switch which selectively connects or disconnects the first node and the boosted positive voltage output node in response to a logic state of a fourth control signal;

a fifth switch which selectively connects or disconnects the first node and a first power source in response to a logic state of a fifth control signal;

a sixth switch which selectively connects or disconnects the first node and the third node in response to a logic state of a sixth control signal;

a seventh switch which selectively connects or disconnects the third node and the boosted positive voltage output node in response to a logic state of a seventh control signal;

an eighth switch which selectively connects or disconnects the second node and the first power source in response to a logic state of an eighth control signal;

a ninth switch which selectively connects or disconnects the second node and the third power source in response to a logic state of a ninth control signal;

a tenth switch which selectively connects or disconnects the fourth node and the first power source in response to a logic state of a tenth control signal;

an eleventh switch which selectively connects or disconnects the fourth node and the third power source in response to a logic state of an eleventh control signal;

a twelfth switch which selectively connects or disconnects the fourth node and a second power source in response to a logic state of a twelfth control signal;

a thirteenth switch which selectively connects or disconnects the fourth node and the boosted negative voltage output node in response to a logic state of a thirteenth control signal; and a fourteenth switch which selectively connects or disconnects the second node and the boosted negative voltage output node in response to a logic state of a fourteenth control signal, and wherein the first control signal through the fourteenth control signal belong to one of a group of the step-down switch control signals and a group of the step-up switch control signals.

18. The boosting power supply unit according to claim 13, wherein the boosting circuit, which comprises separate capacitors subjected to two-phase control of each of the step-down switch control signals and the step-up switch control signals, alternately outputs the boosted positive voltage by the step-up switch control signals and the boosted negative voltage by the step-down switch control signals when the phase control signal has a two-phase pulse form, and outputs one of the boosted positive voltage and the boosted negative voltage when the phase control signal has a logic state value form.

19. The boosting power supply unit according to claim 18, wherein the boosting circuit, which comprises a positive boosting circuit which outputs the boosted positive voltage by means of a first group of capacitors subjected to two-phase control of the step-up switch control signals, and a negative boosting circuit which outputs the boosted negative voltage by means of a second group of capacitors subjected to two-phase control of the step-down switch control signals.

20. The boosting power supply unit according to claim 19, wherein the positive boosting circuit, comprises:

a first capacitor connected between a first node and a second node;

a second capacitor connected between a third node and a fourth node;

a third capacitor connected between a boosted positive voltage output node and a third power source;

a first switch which selectively connects or disconnects the first node and a first power source in response to a logic state of a first control signal;

a second switch which selectively connects or disconnects the first node and the third node in response to a logic state of a second control signal;

a third switch which selectively connects or disconnects the third node and the boosted positive voltage output node in response to a logic state of a third control signal;

a fourth switch which selectively connects or disconnects the first node and the boosted positive voltage output node in response to a logic state of a fourth control signal;

a fifth switch which selectively connects or disconnects the second node and the first power source in response to a logic state of a fifth control signal;

a sixth switch which selectively connects or disconnects the second node and the third power source in response to a logic state of a sixth control signal;

a seventh switch which selectively connects or disconnects the fourth node and the first power source in response to a logic state of a seventh control signal;

an eighth switch which selectively connects or disconnects the fourth node and a second power source in response to a logic state of an eighth control signal; and a ninth switch which selectively connects or disconnects the fourth node and the third power source in response to a logic state of a ninth control signal, and wherein the first control signal through the ninth control signal belong to a group of the step-up switch control signals.

21. The boosting power supply unit according to claim 19, wherein the negative boosting circuit, comprises:

a first capacitor connected between a first node and a second node;

a second capacitor connected between a third node and a fourth node;

a third capacitor connected between a boosted negative voltage output node and a third power source;

a first switch which selectively connects or disconnects the first node and the third power source in response to a logic state of a first control signal;

a second switch which selectively connects or disconnects the first node and the third node in response to a logic state of a second control signal;

a third switch which selectively connects or disconnects the third node and the boosted negative voltage output node in response to a logic state of a third control signal;

a fourth switch which selectively connects or disconnects the first node and the boosted negative voltage output node in response to a logic state of a fourth control signal;

a fifth switch which selectively connects or disconnects the second node and the third power source in response to a logic state of a fifth control signal;

a sixth switch which selectively connects or disconnects the second node and a first power source in response to a logic state of a sixth control signal;

a seventh switch which selectively connects or disconnects the second node and a second power source in response to a logic state of a seventh control signal;

an eighth switch which selectively connects or disconnects the fourth node and the third power source in response to a logic state of an eighth control signal;

a ninth switch which selectively connects or disconnects the fourth node and the second power source in response to a logic state of a ninth control signal; and a tenth switch which selectively connects or disconnects the fourth node and the first power source in response to a logic state of a tenth control signal, and wherein the first control signal through the tenth control signal belong to a group of the step-down switch control signals.

22. A voltage boosting method which outputs a boosted positive voltage to a first boosted voltage output node and outputs a boosted negative voltage to a second boosted voltage output node by sharing a first capacitor connected between a first node and a second node, a second capacitor connected between a third node and a fourth node, a third capacitor connected between the first boosted voltage output node and a third power source, and a fourth capacitor connected between the second boosted voltage output node and the third power source, the method comprising the steps of:

(a) selectively connecting or disconnecting a fourth power source and the first node in response to a logic state of a first control signal;

(b) selectively connecting or disconnecting the fourth power source and the third node in response to a logic state of a second control signal;

(c) selectively connecting or disconnecting the third power source and the third node in response to a logic state of a third control signal;

(d) selectively connecting or disconnecting the first node and the first boosted voltage output node in response to a logic state of a fourth control signal;

(e) selectively connecting or disconnecting the first node and a first power source in response to a logic state of a fifth control signal;

(f) selectively connecting or disconnecting the first node and the third node in response to a logic state of a sixth control signal;

(g) selectively connecting or disconnecting the third node and the first boosted voltage output node in response to a logic state of a seventh control signal;

(h) selectively connecting or disconnecting the second node and the first power source in response to a logic state of an eighth control signal;

(i) selectively connecting or disconnecting the second node and the third power source in response to a logic state of a ninth control signal;

(j) selectively connecting or disconnecting the fourth node and the first power source in response to a logic state of a tenth control signal;

(k) selectively connecting or disconnecting the fourth node and the third power source in response to a logic state of an eleventh control signal;

(l) selectively connecting or disconnecting the fourth node and a second power source in response to a logic state of a twelfth control signal;

(m) selectively connecting or disconnecting the fourth node and the second boosted voltage output node in response to a logic state of a thirteenth control signal; and (n) selectively connecting or disconnecting the second node and the second boosted voltage output node in response to a logic state of a fourteenth control signal.

23. The voltage boosting method according to claim 22, wherein the steps of connecting or disconnecting are performed by a switching means formed using metal-oxide-semiconductor field effect transistors (MOSFETs).

24. The voltage boosting method according to claim 22, wherein each of the boosted voltage output nodes outputs boosted voltages under two-phase control of the control signals.

25. The voltage boosting method according to claim 22, wherein the first boosted voltage output node and the second boosted voltage output node output three boosted positive voltages and three boosted negative voltages, respectively, in response to the control signals.

26. A voltage boosting method which outputs a boosted voltage by using a first capacitor connected between a first node and a second node, a second capacitor connected between a third node and a fourth node and a third capacitor connected between a boosted voltage output node and a third power source, the method comprising the steps of:

(a) selectively connecting or disconnecting the first node and a first power source in response to a logic state of a first control signal;

(b) selectively connecting or disconnecting the first node and the third node in response to a logic state of a second control signal;

(c) selectively connecting or disconnecting the third node and the boosted voltage output node in response to a logic state of a third control signal;

(d) selectively connecting or disconnecting the first node and the boosted voltage output node in response to a logic state of a fourth control signal;

(e) selectively connecting or disconnecting the second node and the first power source in response to a logic state of a fifth control signal;

(f) selectively connecting or disconnecting the second node and the third power source in response to a logic state of a sixth control signal;

(g) selectively connecting or disconnecting the fourth node and the first power source in response to a logic state of a seventh control signal;

(h) selectively connecting or disconnecting the fourth node and a second power source in response to a logic state of an eighth control signal; and (i) selectively connecting or disconnecting the fourth node and the third power source in response to a logic state of a ninth control signal.

27. The voltage boosting method according to claim 26, wherein the steps of connecting or disconnecting are performed by a switching means formed using metal-oxide-semiconductor field effect transistors (MOSFETs).

28. The voltage boosting method according to claim 26, wherein each of the boosted voltage output nodes outputs boosted voltages under two-phase control of the control signals.

29. The voltage boosting method according to claim 26, wherein the boosted voltage output node outputs three boosted voltages in response to the control signals.

30. A voltage boosting method which outputs a boosted voltage by using a first capacitor connected between a first node and a second node, a second capacitor connected between a third node and a fourth node, and a third capacitor connected between a boosted voltage output node and a third power source, the method comprising the steps of:

(a) selectively connecting or disconnecting the first node and the third power source in response to a logic state of a first control signal;

(b) selectively connecting or disconnecting the first node and the third node in response to a logic state of a second control signal;

(c) selectively connecting or disconnecting the third node and the boosted voltage output node in response to a logic state of a third control signal;

(d) selectively connecting or disconnecting the first node and the boosted voltage output node in response to a logic state of a fourth control signal;

(e) selectively connecting or disconnecting the second node and the third power source in response to a logic state of a fifth control signal;

(f) selectively connecting or disconnecting the second node and a first power source in response to a logic state of a sixth control signal;

(g) selectively connecting or disconnecting the second node and a second power source in response to a logic state of a seventh control signal;

(h) selectively connecting or disconnecting the fourth node and the third power source in response to a logic state of an eighth control signal;

(i) selectively connecting or disconnecting the fourth node and the second power source in response to a logic state of a ninth control signal; and (j) selectively connecting or disconnecting the fourth node and the first power source in response to a logic state of a tenth control signal.

31. The voltage boosting method according to claim 30, wherein the steps of connecting or disconnecting are performed by a switching means formed using metal-oxide-semiconductor field effect transistors (MOSFETs).

32. The voltage boosting method according to claim 30, wherein each of the boosted voltage output nodes outputs boosted voltages under two-phase control of the control signals.

33. The voltage boosting method according to claim 30, wherein the boosted voltage output node outputs three boosted voltages in response to the control signals.

34. A power boosting control method comprising the steps of:

(a) outputting a phase control signal having one of two-phase pulse form and logic state value form in response to each of four logic combinations of a first enable signal and a second enable signal;

(b) generating and outputting two-phase step-down switch control signals corresponding to a mode signal in a first logic state of the phase control signal, and generating and outputting two-phase step-up switch control signals corresponding to the mode signal in a second logic state of the phase control signal; and (c) outputting boosted negative voltages by means of capacitors subjected to two-phase control of the step-down switch control signals, and outputting boosted positive voltages by means of capacitors subjected to two-phase control of the step-up switch control signals.

35. The power boosting control method according to claim 34, wherein the first enable signal and the second enable signal are digital signals having different logic states with respect to above and below a threshold amount of power in response to amounts of power consumed in loads connected to the boosted positive voltage and the boosted negative voltage, respectively.

36. The power boosting control method according to claim 34, wherein when both of the first enable signal and the second enable signal have a first logic state, at least one signal of the step-down switch control signals and at least one signal of the step-up switch control signals are not activated.

37. The power boosting control method according to claim 34, wherein in the step of (c), by using shared capacitors subjected to two-phase control of the step-down switch control signals and the step-up switch control signals, the boosted positive voltage by the step-up switch control signals and the boosted negative voltage by the step-down switch control signals are alternately output when the phase control signal has a two-phase pulse form, and one of the boosted positive voltage and the boosted negative voltage is output when the phase control signal has a logic state value form.

38. The power boosting control method according to claim 37, wherein the step of (c) comprises the steps of;

by using a first capacitor connected between a first node and a second node, a second capacitor connected between a third node and a fourth node, a third capacitor connected between a boosted positive voltage output node and a third power source and a fourth capacitor connected between a boosted negative voltage output node and the third power source, (c-1) selectively connecting or disconnecting a fourth power source and the first node in response to a logic state of a first control signal;

(c-2) selectively connecting or disconnecting the fourth power source and the third node in response to a logic state of a second control signal;

(c-3) selectively connecting or disconnecting the third power source and the third node in response to a logic state of a third control signal;

(c-4) selectively connecting or disconnecting the first node and the boosted positive voltage output node in response to a logic state of a fourth control signal;

(c-5) selectively connecting or disconnecting the first node and a first power source in response to a logic state of a fifth control signal;

(c-6) selectively connecting or disconnecting the first node and the third node in response to a logic state of a sixth control signal;

(c-7) selectively connecting or disconnecting the third node and the boosted positive voltage output node in response to a logic state of a seventh control signal;

(c-8) selectively connecting or disconnecting the second node and the first power source in response to a logic state of an eighth control signal;

(c-9) selectively connecting or disconnecting the second node and the third power source in response to a logic state of a ninth control signal;

(c-10) selectively connecting or disconnecting the fourth node and the first power source in response to a logic state of a tenth control signal;

(c-11) selectively connecting or disconnecting the fourth node and the third power source in response to a logic state of an eleventh control signal;

(c-12) selectively connecting or disconnecting the fourth node and a second power source in response to a logic state of a twelfth control signal;

(c-13) selectively connecting or disconnecting the fourth node and the boosted negative voltage output node in response to a logic state of a thirteenth control signal; and (c-14) selectively connecting or disconnecting the second node and the boosted negative voltage output node in response to a logic state of a fourteenth control signal, and wherein the first control signal through the fourteenth control signal belong to one of a group of the step-down switch control signals and a group of the step-up switch control signals.

39. The power boosting control method according to claim 34, wherein in the step of (c), by using separate capacitors subjected to two-phase control of each of the step-down switch control signals and the step-up switch control signals, the boosted positive voltage by the step-up switch control signals and the boosted negative voltage by the step-down switch control signals are alternately output when the phase control signal has a two-phase pulse form, and one of the boosted positive voltage and the boosted negative voltage is output when the phase control signal has a logic state value form.

40. The power boosting control method according to claim 39, wherein the step of (c) comprises the steps of:

(c-1) outputting the boosted positive voltage by means of a first group of capacitors subjected to two-phase control of the step-up switch control signals; and (c-2) outputting the boosted negative voltage by means of a second group of capacitors subjected to two-phase control of the step-down switch control signals.

41. The power boosting control method according to claim 40, wherein the step of (c-1) comprises the steps of:

by using a first capacitor connected between a first node and a second node, a second capacitor connected between a third node and a fourth node, and a third capacitor connected between a boosted positive voltage output node and a third power source, (c-1-1) selectively connecting or disconnecting the first node and a first power source in response to a logic state of a first control signal;

(c-1-2) selectively connecting or disconnecting the first node and the third node in response to a logic state of a second control signal;

(c-1-3) selectively connecting or disconnecting the third node and the boosted positive voltage output node in response to a logic state of a third control signal;

(c-1-4) selectively connecting or disconnecting the first node and the boosted positive voltage output node in response to a logic state of a fourth control signal;

(c-1-5) selectively connecting or disconnecting the second node and the first power source in response to a logic state of a fifth control signal;

(c-1-6) selectively connecting or disconnecting the second node and the third power source in response to a logic state of a sixth control signal;

(c-1-7) selectively connecting or disconnecting the fourth node and the first power source in response to a logic state of a seventh control signal;

(c-1-8) selectively connecting or disconnecting the fourth node and a second power source in response to a logic state of an eighth control signal; and (c-1-9) selectively connecting or disconnecting the fourth node and the third power source in response to a logic state of a ninth control signal, and wherein the first control signal through the ninth control signal belong to a group of the step-up switch control signals.

42. The power boosting control method according to claim 40, wherein the step of (c-2) comprises the steps of:

by using a first capacitor connected between a first node and a second node, a second capacitor connected between a third node and a fourth node, and a third capacitor connected between a boosted negative voltage output node and a third power source, (c-2-1) selectively connecting or disconnecting the first node and the third power source in response to a logic state of a first control signal;

(c-2-2) selectively connecting or disconnecting the first node and the third node in response to a logic state of a second control signal;

(c-2-3) selectively connecting or disconnecting the third node and the boosted negative voltage output node in response to a logic state of a third control signal;

(c-2-4) selectively connecting or disconnecting the first node and the boosted negative voltage output node in response to a logic state of a fourth control signal;

(c-2-5) selectively connecting or disconnecting the second node and the third power source in response to a logic state of a fifth control signal;

(c-2-6) selectively connecting or disconnecting the second node and a first power source in response to a logic state of a sixth control signal;

(c-2-7) selectively connecting or disconnecting the second node and a second power source in response to a logic state of a seventh control signal;

(c-2-8) selectively connecting or disconnecting the fourth node and the third power source in response to a logic state of an eighth control signal;

(c-2-9) selectively connecting or disconnecting the fourth node and the second power source in response to a logic state of a ninth control signal; and (c-2-10) selectively connecting or disconnecting the fourth node and the first power source in response to a logic state of a tenth control signal, and wherein the first control signal through the tenth control signal belong to a group of the step-down switch control signals.

* * * * *

UNITED STATES PATENT AND TRADEMARK OFFICE
CERTIFICATE OF CORRECTION

PATENT NO. : 6,906,577 B2  
APPLICATION NO. : 10/925116  
DATED : June 14, 2005  
INVENTOR(S) : Hyoung-Rae Kim It is certified that error appears in the above-identified patent and that said Letters Patent is hereby corrected as shown below:

Column 9, line 10 "…….C1 through C3…." is replaced with "……C1 through C4….."

Column 9, lines 25-26 "……C1 through C3….." is replaced with "…..C1 through C4….."

Column 11, line 16 "…….2VCI" is replaced with "….4VCI….."

Column 11, line 26 "……..2VCI" is replaced with "….4VCI….."

Signed and Sealed this

Twenty-eighth Day of November, 2006

JON W. DUDAS  
*Director of the United States Patent and Trademark Office*